United States Patent
Yin et al.

(10) Patent No.: US 9,686,759 B2
(45) Date of Patent: Jun. 20, 2017

(54) SYSTEMS AND METHODS FOR UPLINK TRANSMISSION POWER CONTROL

(71) Applicant: Sharp Kabushiki Kaisha, Osaka-shi, Osaka (JP)

(72) Inventors: Zhanping Yin, Vancouver, WA (US); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/192,800

(22) Filed: Jun. 24, 2016

(65) Prior Publication Data

US 2016/0309429 A1 Oct. 20, 2016

Related U.S. Application Data

(63) Continuation of application No. 14/335,802, filed on Jul. 18, 2014.

(51) Int. Cl.
*H04W 52/50* (2009.01)
*H04W 52/14* (2009.01)
(Continued)

(52) U.S. Cl.
CPC ......... *H04W 52/50* (2013.01); *H04W 52/146* (2013.01); *H04W 52/346* (2013.01); *H04W 52/367* (2013.01); *H04W 72/0473* (2013.01); *H04L 5/001* (2013.01); *H04L 5/0053* (2013.01); *H04L 5/1469* (2013.01); *H04W 88/06* (2013.01)

(58) Field of Classification Search
None
See application file for complete search history.

(56) References Cited

U.S. PATENT DOCUMENTS

| 8,737,211 B2 | 5/2014 | Zhang et al. |
| 2010/0246705 A1 | 9/2010 | Shin et al. |

(Continued)

FOREIGN PATENT DOCUMENTS

| WO | 2013009892 | 1/2013 |
| WO | 2013020050 | 2/2013 |
| WO | 2013025236 | 2/2013 |

OTHER PUBLICATIONS

International Search Report and Written Opinion issued for International Application No. PCT/US2015/040991 on Nov. 30, 2015.
(Continued)

*Primary Examiner* — Peter Chau
(74) *Attorney, Agent, or Firm* — Austin Rapp

(57) ABSTRACT

A user equipment (UE) for performing uplink transmission power control is described. The UE includes a processor and memory in electronic communication with the processor. The UE determines that dual connectivity is configured with more than one cell group. The UE also determines if a total transmission power of the cell groups exceeds a maximum allowed transmission power of the UE. The UE further determines if the cell groups are asynchronized and whether look-ahead with processing time reduction is supported by the UE. The UE additionally determines an available transmission power in a subframe of a given cell group. The UE also transmits uplink (UL) channels in a subframe based on the available transmission power of the given cell group.

8 Claims, 14 Drawing Sheets

(51) Int. Cl.
*H04W 52/36* (2009.01)
*H04W 52/34* (2009.01)
*H04W 72/04* (2009.01)
*H04W 88/06* (2009.01)
*H04L 5/00* (2006.01)
*H04L 5/14* (2006.01)

(56) References Cited

U.S. PATENT DOCUMENTS

| | | |
|---|---|---|
| 2011/0205983 A1 | 8/2011 | Bharadwaj et al. |
| 2012/0113831 A1 | 5/2012 | Pelletier et al. |
| 2012/0258707 A1 | 10/2012 | Mathias et al. |
| 2013/0003631 A1 | 1/2013 | Catovic et al. |
| 2013/0044831 A1 | 2/2013 | Narasimha et al. |
| 2013/0188613 A1 | 7/2013 | Dinan |
| 2013/0258980 A1 | 10/2013 | Kim et al. |
| 2013/0265966 A1 | 10/2013 | Yu et al. |
| 2013/0294390 A1 | 11/2013 | Yang et al. |
| 2013/0308612 A1 | 11/2013 | Cai et al. |
| 2014/0050205 A1* | 2/2014 | Ahn ............... H04W 52/146 370/336 |
| 2014/0119345 A1 | 5/2014 | Sikri et al. |
| 2015/0201383 A1 | 7/2015 | Papasakellariou et al. |
| 2015/0215943 A1 | 7/2015 | Vajapeyam et al. |
| 2015/0215944 A1 | 7/2015 | Kim et al. |
| 2015/0271713 A1 | 9/2015 | Kim et al. |
| 2015/0271761 A1 | 9/2015 | Park |
| 2015/0271765 A1 | 9/2015 | Hakola et al. |
| 2015/0282103 A1 | 10/2015 | Immonen et al. |
| 2015/0282104 A1 | 10/2015 | Damnjanovic et al. |
| 2015/0304957 A1 | 10/2015 | Noh et al. |
| 2016/0255593 A1* | 9/2016 | Blankenship ....... H04W 52/146 |

OTHER PUBLICATIONS

InterDigital, "Report of the offline discussion power sharing for dual connectivity," 3GPP TSG RAN Wg1 Meeting #77, Seoul, China, May 2014 [R1-142654].

LG Electronics et al., "WF on Power control for Dual-Connectivity," 3GPP TSG RAN WG1 #77, Seoul, Korea, May 2014 [R1-142675].

InterDigital et al. "Way Forward on Power Sharing for Dual Connectivity," [R1-142589]. May 2014.

"RAN1 Chairman's Notes," 3GPP TSG RAN WG1 Meeting #77, Seoul Korea, May 2014.

3GPP TS 36.213 V12.2.0, Jun. 2014.

InterDigital, "Power sharing in dual connectivity", May 19-23, 2014, 3GPP TSG-RAN WG1.

Texas Instruments, "On UL Power Control for Dual Connectivity", May 19-23, 2014, 3GP TSG-RAN WG1.

NTT DOCOMO, "Summary of email discussion [77-13]: Details of PxeNB for power0control of dual connectivity", May 19-23, 2014, 3GPP TSG-RAN WG1.

Office Action issued for U.S. Appl. No. 14/335,802 on Nov. 30, 2015.

\* cited by examiner

SYSTEMS AND METHODS FOR UPLINK TRANSMISSION POWER CONTROL

CLAIM OF PRIORITY

This application is a continuation of U.S. patent application Ser. No. 14/335,802, filed Jul. 18, 2014, titled "SYSTEMS AND METHODS FOR UPLINK TRANSMISSION POWER CONTROL," with inventors Zhanping Yin and Shohei Yamada.

TECHNICAL FIELD

The present disclosure relates generally to communication systems. More specifically, the present disclosure relates to systems and methods for uplink transmission power control.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and efficiency have been sought. However, improving communication capacity, speed, flexibility and efficiency may present certain problems.

For example, wireless communication devices may communicate with one or more devices using multiple connections. However, the multiple connections may only offer limited flexibility and efficiency. As illustrated by this discussion, systems and methods that improve communication flexibility and efficiency may be beneficial.

DETAILED DESCRIPTION

Figure 1:
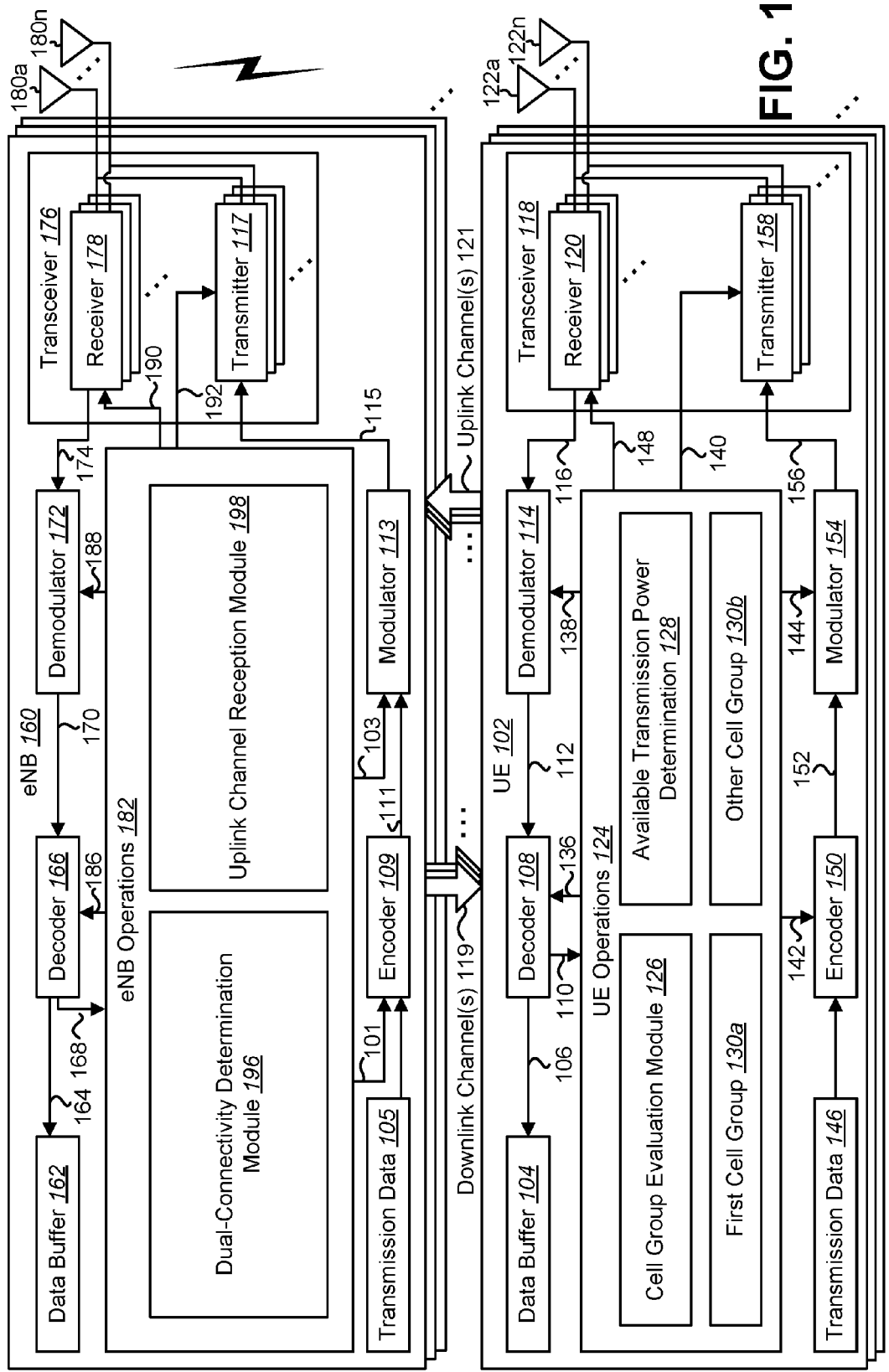
FIG. 1 is a block diagram illustrating one configuration of one or more evolved Node Bs (eNBs) and one or more user equipments (UEs) in which systems and methods for uplink transmission power control may be implemented.

A user equipment (UE) for performing uplink transmission power control is described. The UE includes a processor and memory in electronic communication with the processor. The UE determines that dual connectivity is configured with more than one cell group. The UE also determines if a total transmission power of the cell groups exceeds a maximum allowed transmission power of the UE. The UE further determines if the cell groups are asynchronized and whether look-ahead with processing time reduction is supported by the UE. The UE additionally determines an available transmission power in a subframe of a given cell group. The UE also transmits uplink (UL) channels in a subframe based on the available transmission power of the given cell group.

If the total transmission power of the cell groups exceeds the maximum allowed transmission power of the UE, the cell groups are asynchronized, and processing time reduction and look-ahead are not supported by the UE, then for a given subframe of a first cell group that overlaps with an earlier subframe and a later subframe of the other cell group, the UE may determine the transmission power allocated for the earlier subframe of the other cell group. The UE may also determine if a guaranteed power is configured for a cell group. The UE may further determine if there is a potential UL transmission in the later subframe of the other cell group. The UE may additionally determine the available transmission power in the given subframe of the first cell group. The UE may also transmit uplink channels in the given subframe of the first cell group based on the available transmission power of the first cell group.

If a guaranteed power is configured for the other cell group, and there is no potential UL transmission in the later subframe of the other cell group based on at least one of semi-static information and dynamic information, then the UE may determine the available transmission power in the given subframe of the first cell group as the maximum allowed transmission power of the UE reduced by the power allocated in the later subframe of the other cell group. The UE may also transmit uplink channels in the given subframe of the first cell group by replacing the maximum allowed transmission power of the UE with the available transmission power of the first cell group.

To determining that there is no potential UL transmission in the later subframe of the other cell group based on semi-static information, the UE may determine that the later subframe of the other cell group has no uplink allocation based on time division duplexing (TDD) uplink/downlink (UL/DL) configurations of the serving cells.

To determine that there is no potential UL transmission in the later subframe of the other cell group based on semi-static information, the UE may determine that the later subframe of the other cell group has an uplink subframe allocation. The UE may also determine that there is no semi-statically configured transmission in the later subframe of the other cell group. The semi-statically configured transmission comprises at least one of periodic channel state information (CSI) and semi-persistent scheduling (SPS).

To determine that there is no potential UL transmission in the later subframe of the other cell group based on semi-static information, the UE may determine that the later subframe of the other cell group has an uplink subframe allocation. The UE may also determine that there is no semi-statically configured physical random access channel (PRACH) or scheduling request (SR) resources in the later subframe of the other cell group.

To determine that there is no potential UL transmission in the later subframe of the other cell group based on dynamic information, the UE may determine that the cells in the other cell group include one or more enhanced interference mitigation and traffic adaptation (eIMTA) cells. The UE may also determine that a valid UL/DL configuration is received in reconfiguration downlink control information (DCI) that configures the later subframe of the other cell group as a DL subframe.

To determine that there is no potential UL transmission in the later subframe of the other cell group based on dynamic information, the UE may determine that the later subframe of the other cell group has no downlink hybrid automatic repeat request (HARQ) association linkage or has a minimum downlink HARQ association linkage greater than 4 milliseconds. The UE may also determine that the later subframe of the other cell group has an uplink scheduling linkage greater than 4 milliseconds. The UE may further determine that there is no physical downlink shared channel (PDSCH) transmitted in any subframes included in a DL association set of the later subframe. The UE may additionally determine that there is no physical uplink shared channel (PUSCH) scheduled in the later subframe.

To determine that there is no potential UL transmission in the later subframe of the other cell group based on dynamic information the UE may determine that the cells in the other cell group include eIMTA cells. The UE may also determine that the later subframe of the other cell group has a minimum downlink HARQ association linkage of 4 milliseconds or an uplink scheduling linkage of 4 milliseconds. The UE may further determine that there is no PDSCH transmitted in any subframe earlier than the fourth subframe before the later subframe in the DL association set of the later subframe. The UE may additionally determine that a valid UL/DL configuration is received in a reconfiguration DCI that configures the fourth subframe before the later subframe as a UL subframe.

If a guaranteed power is configured for the other cell group, and there is a potential UL transmission in the later subframe of the other cell group based on at least one of semi-static information and dynamic information, then the UE may determine the available transmission power in the given subframe of the first cell group as the maximum allowed transmission power of the UE reduced by the maximum value of the power allocated in the later subframe of the other cell group or the guaranteed power of the other cell group. The UE may also transmit uplink channels in the given subframe of the first cell group by replacing the maximum allowed transmission power of the UE with the available transmission power of the first cell group.

To determine that there is a potential UL transmission in the later subframe of the other cell group based on semi-static information, the UE may determine that there is a semi-statically configured transmission in the later subframe of the other cell group. The semi-statically configured transmission comprises at least one of periodic CSI and SPS.

To determine that there is a potential UL transmission in the later subframe of the other cell group based on dynamic information, the UE may determine that there is at least one PDSCH transmission in a DL subframe set of the later subframe of the other cell group.

To determine that there is a potential UL transmission in the later subframe of the other cell group based on dynamic information, the UE may determine that there is a PUSCH scheduled in the later subframe of the other cell group.

To determine that there is a potential UL transmission in the later subframe of the other cell group based on dynamic information, the UE may determine that the later subframe of the other cell group is an uplink subframe. The UE may also determine that the later subframe of the other cell group has a minimum downlink HARQ association linkage of 4 milliseconds or an uplink scheduling linkage of 4 milliseconds. The UE may further determine that the later subframe of the other cell group is configured as a UL subframe and the fourth subframe before the later subframe is configured as a DL subframe if the cell is an eIMTA cell.

If a guaranteed power is configured for the other cell group, and there is no potential PRACH and UCI transmission in the later subframe of the other cell group based on at least one of semi-static information and dynamic information, then the UE may determine the available transmission power in the given subframe of the first cell group as the maximum allowed transmission power of the UE reduced by the power allocated in the later subframe of the other cell group. The UE may also transmit uplink channels in the given subframe of the first cell group by replacing the maximum allowed transmission power of the UE with the available transmission power of the first cell group.

An evolved node B (eNB) for performing uplink transmission power control is also described. The eNB includes a processor and memory in electronic communication with the processor. The eNB determines that dual connectivity is configured with more than one cell groups. The eNB also determines if a guaranteed power is configured for each cell group for a UE. The eNB further determines if the cell groups are asynchronized and whether look-ahead with processing time reduction is supported by the UE. The eNB additionally receives uplink channels in a subframe based on an available transmission power of a given cell group. The receiving is based on different assumptions of the available transmission power.

If a total transmission power of the cell groups exceeds the maximum allowed transmission power of the UE, the cell groups are asynchronized, and processing time reduction and look-ahead are not supported by the UE, then for a given subframe of a first cell group that overlaps with an earlier subframe and a later subframe of the other cell group, the eNB may receive uplink channels in the given subframe of the first cell group based on an available transmission power of the first cell group. The available transmission power of the first cell group may be determined based on whether there is a potential UL transmission in the later subframe of the other cell group.

If a guaranteed power is configured for the other cell group, and there is no potential UL transmission in the later subframe of the other cell group based on at least one of semi-static information and dynamic information, then the eNB may receive the uplink channels in the given subframe of the first cell group based on the available transmission power of the first cell group. The available transmission power in the given subframe of the first cell group may be determined as the maximum allowed transmission power of the UE reduced by the power allocated in the later subframe of the other cell group.

If a guaranteed power is configured for the other cell group, and there is a potential UL transmission in the later subframe of the other cell group based on at least one of semi-static information and dynamic information, then the eNB may receive the uplink channels in the given subframe of the first cell group based on the available transmission power of the first cell group. The available transmission power in the given subframe of the first cell group may be determined as the maximum allowed transmission power of the UE reduced by the maximum value of the power allocated in the later subframe of the other cell group or the guaranteed power of the other cell group.

If a guaranteed power is configured for the other cell group, and there is no PRACH and UCI transmission in the later subframe of the other cell group based on at least one of semi-static information and dynamic information, then the eNB may receive uplink channels in the given subframe of the first cell group based on the available transmission power of the first cell group. The available transmission power in the given subframe of the first cell group may be determined as the maximum allowed transmission power of the UE reduced by the power allocated in the later subframe of the other cell group.

A method for performing uplink transmission power control by a UE is also described. The method includes determining that dual connectivity is configured with more than one cell group. The method also includes determining if a total transmission power of the cell groups exceeds a maximum allowed transmission power of the UE. The method further includes determining if the cell groups are asynchronized and whether look-ahead with processing time reduction is supported by the UE. The method additionally includes determining an available transmission power in a subframe of a given cell group. The method also includes transmitting UL channels in a subframe based on the available transmission power of the given cell group.

A method for performing uplink transmission power control by an eNB is also described. The method includes determining that dual connectivity is configured with more than one cell groups. The method also includes determining if a guaranteed power is configured for each cell group for a UE. The method further includes determining if the cell groups are asynchronized and whether look-ahead with processing time reduction is supported by the UE. The method additionally includes receiving uplink channels in a subframe based on an available transmission power of a given cell group. The receiving is based on different assumptions of the available transmission power.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall descriptions, as used herein, a "cell" may be defined as a "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or zero, one or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for dual-connectivity operation. This may be done in the context of an evolved universal terrestrial radio access network (E-UTRAN). For example, dual-connectivity operation between a UE and two or more eNBs on an E-UTRAN is described. In one configuration, the two or more eNBs may have different schedulers.

The systems and methods described herein may enhance the efficient use of radio resources in dual-connectivity operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB.

However, in a small cell deployment scenario, each node (e.g., eNB, RRH, etc.) may have its own independent scheduler. To maximize the efficiency of radio resources utilization of both nodes, a UE may connect to two or more nodes that have different schedulers.

In one configuration, for a UE to connect to two nodes (e.g., eNBs) that have different schedulers, dual-connectivity between the UE and E-UTRAN may be utilized. For example, in addition to Rel-11 operation, a UE operating according to the Rel-12 standard may be configured with dual-connectivity (which may also be referred to as multi-connectivity, inter-eNB carrier aggregation, multi-flow, multi-cell cluster, multi-Uu, etc.). Because a maximum of two connections are currently considered, terminology of "dual-connectivity" may be used. The UE may connect to the E-UTRAN with multiple Uu interfaces, if configured. For instance, the UE may be configured to establish one or more additional radio interfaces by using one radio interface.

As used herein, a cell group is a group of serving cells controlled by the same scheduler. In one configuration, a cell group can be configured with up to 5 serving cells. A master cell group (MCG) may provide cell group control (e.g., radio resource control, non-access stratum (NAS), security, mobility etc.) in dual-connectivity. A master eNB (MeNB) is the eNB of the MCG. A secondary cell group (SCG) is the secondary cell group in dual-connectivity. A secondary eNB (SeNB) is the eNB of the SCG.

For dual-connectivity, both synchronized and asynchronized (e.g., non-synchronized) cell groups may be supported. In a synchronized case, the subframes in all cell groups are aligned within a time difference threshold. The synchronized cell group may allow some timing advance (TA) differences. The conditions of a synchronous case may be defined according to the RAN4 definition of synchronized dual connectivity operation. In terms of a maximum uplink transmission timing difference, the synchronous case may be described as the maximum uplink transmission timing difference between PCells and pSCells is less than X or the maximum uplink transmission timing difference between all TAGs is less than X, where X is the threshold value (e.g., 40 mircoseconds).

In an asynchronized case, the subframes in different cell groups are not aligned. In other words, the subframes in the cell groups have a time difference that is more than a defined threshold. In other words, the maximum uplink transmission timing difference between PCells and pSCells is greater than X or the maximum uplink transmission timing difference between all TAGs is greater than X.

In the asynchronized case, a subframe on one cell group may overlap with two subframes on the other cell group. In some configurations, look-ahead may be assumed for the power allocation. Look-ahead may be defined as the UE knows the actual UL transmission(s) in the latter part of the overlapping portion. In other words, a UE may consider the uplink transmission in a later overlapping subframe for the power allocation of the current uplink transmission. To implement the look-ahead, the UE may need a processing time that is less than 4 milliseconds (ms). Thus, look-ahead can be supported if the processing time can be reduced to 3 ms in the worst case.

Dual-connectivity may provide an enhancement for small cell deployment. One of the key issues associated with dual-connectivity is the uplink power control for simultaneous uplink channel transmissions. In a power unlimited case, the uplink channel on each cell group should be transmitted using existing power control parameters and procedures. As used herein, the power unlimited case means that the total scheduled transmission power of uplink signals on all cell groups does not exceed the maximum allowed transmission power (i.e. $P_{cmax}$) of the given UE. In the power unlimited case, simultaneous uplink transmission from the MCG and the SCG should be performed independently.

In a power limited case, where the total scheduled uplink transmission powers on the MCG and the SCG exceed the maximum allowed transmission power of the UE ($P_{cmax}$) power allocation of each cell group must take into account the uplink transmissions of the other cell group. Furthermore, in an asynchronized case, the problem becomes more complicated because an uplink subframe in one cell group may overlap with two subframes in another cell group.

In one approach, each cell group can be configured with a guaranteed power before allocation of the remaining power to the channels on different cell groups. If look-ahead is assumed (i.e., the processing time can be reduced to 3 ms), the same priority handling can be applied in an asynchronous case as in a synchronous case by considering the overlapping subframes at both sides. However, if reduced processing time cannot be assumed, look-ahead is not assumed. Thus, the behavior of the UE for an asynchronous case with non-look-ahead operation may be defined.

For a cell group with only frequency division duplexing (FDD) cells, or where an FDD cell is the primary cell (PCell) or primary secondary cell (pSCell) of the cell group, a no look-ahead operation requires a UE to reserve guaranteed power for the other cell group because there may be potential uplink transmissions on the other cell group. For a time division duplexing (TDD) serving cell, and a cell group with a TDD PCell or a TDD pSCell, semi-static or dynamic information may be used to determine whether power should be reserved for a cell group or not.

Dynamic information can be utilized to improve the power allocation efficiency in the no look-ahead case. Depending on the TDD configuration, a cell may have different hybrid automatic repeat request acknowledgement/negative acknowledgement (HARQ-ACK) reporting and UL scheduling timings. If the associated timing between the latest DL subframe of the DL association set and the uplink subframe is more than 4 ms, the UE has enough processing time to determine whether HARQ-ACK reporting is needed in a later subframe without reducing the processing time below 4 ms. Similarly, if the associated timing between the DL subframe issuing the UL grant for physical uplink shared channel (PUSCH) scheduling and the uplink subframe for PUSCH transmission is more than 4 ms, the UE has enough processing time to determine whether PUSCH will be transmitted (or not) in a later subframe without reducing the processing time below 4 ms. Thus, the guaranteed power may not be reserved for the other cell group if the UE knows there will be no uplink transmissions in a later subframe on that cell group.

Furthermore, the guaranteed power may be reserved only for more important uplink control information (UCI). This UCI may include HARQ-ACK or CSI. Because a PUSCH without UCI can be power scaled and retransmitted in a HARQ process, the guaranteed power for a PUSCH transmission without UCI can be relaxed or removed so that the UE can achieve better power efficiency.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for uplink transmission power control may be implemented. The one or more UEs 102 may communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, etc. Examples of downlink signals include a primary synchronization signal (PSS), a cell-specific reference signal (CRS), and a channel state information (CSI) reference signal (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a cell group evaluation module 126 and an available transmission power determination module 128. The UE operations module 124 may provide the benefit of utilizing the radio resources of a first cell group 130a and another cell group 130b efficiently.

The cell group evaluation module 126 may determine that dual-connectivity is configured with more than one cell group 130. For example, the UE 102 may be connected to the first cell group 130a and the other cell group 130b. In one configuration, the first cell group 130a may be a master cell group (MCG) and the other cell group 130b may be a secondary cell group (SCG). In another configuration, the first cell group 130a may be the SCG and the other cell group 130b may be the MCG.

For the uplink transmissions in a subframe n, the cell group evaluation module 126 may determine if a total scheduled transmission power of the cell groups 130 exceeds a maximum allowed transmission power of the UE 102 ($P_{cmax}$). If the total scheduled transmission power of the cell groups 130 does not exceed the maximum allowed transmission power of the UE 102, then the UE 102 is in a power unlimited case. In this case, simultaneous uplink transmission from the cell groups 130 (e.g., MCG and the SCG) should be performed independently according to scheduled uplink transmission powers and existing priority rules within each cell group 130.

In any portion of a subframe, if the total scheduled transmission power of the cell groups 130 exceeds the maximum allowed transmission power of the UE 102, then the UE 102 is in a power limited case. In this case, if the total scheduled uplink transmission powers on the cell groups 130 exceed the maximum allowed transmission power of the UE 102, the UE 102 may allocate power to each cell group 130. By allocating power to each cell group 130, the UE 102 may keep the total transmission power within the power limit.

The cell group evaluation module 126 may determine if the cell groups 130 (i.e., the first cell group 130a and the other cell group 130b) are asynchronized and whether look-ahead with processing time reduction is supported by the UE 102. With asynchronized cell groups 130, the subframes in the different cell are not aligned. The subframes of one cell group 130 and another cell group 130 may have a time difference more than a defined threshold. Therefore, the subframe of one cell group 130 overlaps with two subframes of another cell group 130 in asynchronized cell groups 130. In other words, in asynchronized cell groups 130, a given subframe n of the first cell group 130a overlaps with an earlier subframe m−1 and a later subframe m of the other cell group 130b. An example of asynchronized cell groups 130 is described in connection with FIG. 6.

The available transmission power determination module 128 may determine an available transmission power in a subframe n ($P_{available\_subframe\_n}$) of a given cell group 130. The available transmission power determination module 128 may allocate power to the uplink channels 121 in subframe n of a first cell group 130a by replacing $P_{cmax}$ with $P_{available\_subframe\_n}$ for the first cell group 130a. If processing time reduction and look-ahead are not supported by the UE 102, the transmission of an uplink subframe in one cell group 130 may not consider the type of channels or information to be transmitted in a later subframe of another cell group 130. However, some information can be used to determine whether there are potential transmissions in a later subframe m of the other cell group 130b to determine power reservation for the other cell group 130b. For example, the UE 102 may determine whether there are potential UL transmissions in the later subframe m of the other cell group 130b based on semi-static information or dynamic information.

For semi-static information, there may be a potential UL transmission in a later subframe m in the other cell group 130b in certain cases of a semi-static configuration. In a first case of semi-static information, the UE 102 may determine that the later subframe m of the other cell group 130b has no uplink allocation based on time division duplexing (TDD) uplink/downlink (UL/DL) configurations of the serving cells.

In a second case of semi-static information, the UE 102 may determine that a later subframe m of the other cell group 130b has an uplink subframe allocation. To determine whether there is a potential UL transmission in the later subframe m of the other cell group 130b, the UE 102 may determine whether there is a semi-statically configured transmission in the later subframe of the other cell group 130b. The semi-statically configured transmission may include at least one of periodic channel state information (CSI) and semi-persistent scheduling (SPS).

In a third case of semi-static information, the UE 102 may determine that the later subframe of the other cell group 130b has an uplink subframe allocation. To determine whether there is a potential UL transmission in the later subframe m of the other cell group 130b, the UE 102 may determine whether there is a semi-statically configured physical random access channel (PRACH) or scheduling request (SR) resources in the later subframe m of the other cell group 130b.

Dynamic information or signaling may also indicate whether there is a potential UL transmission in a subframe m for a cell group 130. In a first case of dynamic information, the UE 102 may determine that the cells in the other cell group 130b include one or more eIMTA cells. To determine whether there is no potential UL transmission in the later subframe m of the other cell group 130b, the UE 102 may determine that a valid UL/DL configuration is received in reconfiguration downlink control information (DCI) that configures the later subframe of the other cell group 130b as a DL subframe.

In a second case of determining that there is no potential UL transmission in the later subframe m based on dynamic information, the UE 102 may determine whether the later subframe m of the other cell group 130b has no HARQ association linkage or has a minimum downlink HARQ association linkage greater than 4 milliseconds. The UE 102 may also determine whether the later subframe m of the other cell group 130b has an uplink scheduling linkage greater than 4 milliseconds. The UE 102 may further determine whether there is no PDSCH transmitted in any subframes included in a DL association set of the later subframe m. The UE 102 may additionally determine whether there is no PUSCH scheduled in the later subframe m.

In a third case of determining that there is no potential UL transmission in the later subframe m based on dynamic information, the UE 102 may determine that the cells in the other cell group 130b include eIMTA cells. The UE 102 may also determine that the later subframe m of the other cell group 130b has a minimum downlink HARQ association linkage of 4 milliseconds or an uplink scheduling linkage of 4 milliseconds. The UE 102 may further determine that there is no PDSCH transmitted in any subframe earlier than the fourth subframe before the later subframe (e.g., m−4) in the DL association set of the later subframe m. The UE 102 may additionally determine that a valid UL/DL configuration is received in a reconfiguration DCI that subframe m−4 as a UL subframe.

If the UE 102 determines that there is no potential UL transmission in the later subframe m of the other cell group 130b, the available transmission power determination module 128 may determine the available transmission power in the given subframe n of the first cell group 130a as the maximum allowed transmission power of the UE 102 reduced by the power allocated in the later subframe m of the other cell group 130b. However, if the UE 102 determines that there is a potential UL transmission in the later subframe m of the other cell group 130b, the available transmission power determination module 128 may determine the available transmission power in the given subframe n of the first cell group 130a as the maximum allowed transmission power of the UE 102 reduced by the maximum value of the power allocated in the later subframe m of the other cell group 130b or the guaranteed power of the other cell group 130b.

The UE 102 may transmit UL channels 121 in a subframe based on the available transmission power of the given cell group 130. In one configuration, the UE 102 may transmit UL channels 121 in the given subframe n of the first cell group 130a by replacing the maximum allowed transmission power of the UE 102 ($P_{cmax}$) with the available transmission power ($P_{available\_subframe\_n}$) of the first cell group 130a.

The UE operations module 124 may provide information 148 to the one or more receivers 120. The UE operations module 124 may also provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include uplink channel 121 information (e.g., PUSCH or PUCCH) on the first cell group 130a or the other cell group 130b.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

In general, the eNB operations module 182 may enable the eNB 160 to communicate with the one or more UEs 102. The eNB operations module 182 may include one or more of a dual-connectivity determination module 196 and an UL channel reception module 198. The eNB operations module 182 may provide the benefit of utilizing the radio resources of a first cell group 130a and another cell group 130b efficiently.

If the eNB 160 supports dual-connectivity, the dual-connectivity determination module 196 may determine that dual-connectivity is configured with more than one cell group 130. For example, the eNB 160 may provide a first cell group 130a and another eNB 160 may provide the other cell group 130b. The cell group 130 may be an MCG or an SCG.

The dual-connectivity determination module 196 may determine if a guaranteed power is configured for each cell group 130 for a UE 102. If a cell group 130 is configured with a minimum guaranteed power, then the UE 102 may reserve a certain amount of power for the other cell group 130 for a potential uplink transmission on the other cell group 130b.

The dual-connectivity determination module 196 may determine if the cell groups are asynchronized and whether look-ahead with processing time reduction is supported by the UE 102. An example of asynchronized cell groups 130 is described in connection with FIG. 6. Two types of operation may be considered based on whether look-ahead with processing time reduction is supported by the UE 102. With look-ahead operation, the transmission of an uplink subframe in one cell group 130 may consider the type of channels or information to be transmitted in a later subframe of another cell group 130.

The UL channel reception module 198 may receive uplink channels 121 in a subframe based on different assumptions of transmission power of a given cell group 130. The UL channel reception module 198 may receive the uplink channels 121 based on different assumptions of the available transmission power. If the total scheduled transmission power of the cell groups 130 does not exceed the maximum allowed transmission power of the UE 102, then the UE 102 is in a power unlimited case. In this case, simultaneous uplink transmission from each cell group 130 (e.g., the MCG and the SCG) should be performed independently by the eNB 160. The UL channel reception module 198 may expect to receive the uplink channels 121 on the cell group 130 with the scheduled power.

However, if the total transmission power of the cell groups 130 exceeds the maximum allowed transmission power of the UE 102, the cell groups are asynchronized, and processing time reduction and look-ahead are not supported by the UE 102, then the available transmission power of the first cell group 130a may be determined based on whether there is a potential UL transmission in the later subframe of the other cell group 130b.

If processing time reduction and look-ahead are not supported by the UE 102, the transmission of an uplink subframe in one cell group 130 may not consider the type of channels or information to be transmitted in a later subframe of another cell group 130. However, the eNB 160 may consider different assumptions on whether there are UL transmissions in the subframe overlapping region of the other cell group 130b for uplink reception. In one case, the UL channel reception module 198 may expect to receive the uplink channel 121 with the scheduled power (e.g., if there is no uplink transmission in any overlapping part of the subframe). In another case, the UL channel reception module 198 may expect to receive the uplink channel 121 with lower than scheduled power or the uplink channel 121 may be dropped due to insufficient power (e.g., if there are uplink transmissions in overlapping part of the subframe that reduces the available power for the uplink transmission of the subframe on the given cell group 130).

The eNB operations module 182 may provide information 190 to the one or more receivers 178. For example, the eNB operations module 182 may inform the receiver(s) 178 when or when not to receive transmissions based on the received UCI and channels.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

In general, the eNB operations module 182 may enable the eNB 160 to communicate with one or more network nodes (e.g., a mobility management entity (MME), serving gateway (S-GW), eNBs). The eNB operations module 182 may also generate a RRC connection reconfiguration message to be signaled to the UE 102. The RRC connection reconfiguration message may or may not include SCG configuration parameters for SCG 357 addition modification. The eNB operations module 182 may send, to the other eNB 160, the RRC connection reconfiguration message to be signaled to the UE 102. For example, the other eNB 160 may receive the SCG configuration parameters for SCG 357 addition or modification from the eNB 160 as a container. The eNB 160 may generate a RRC connection reconfiguration message that may include the received container and may send the RRC connection reconfiguration message to the UE 102. The eNB 160 may just send a RRC connection reconfiguration message included in the received container.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
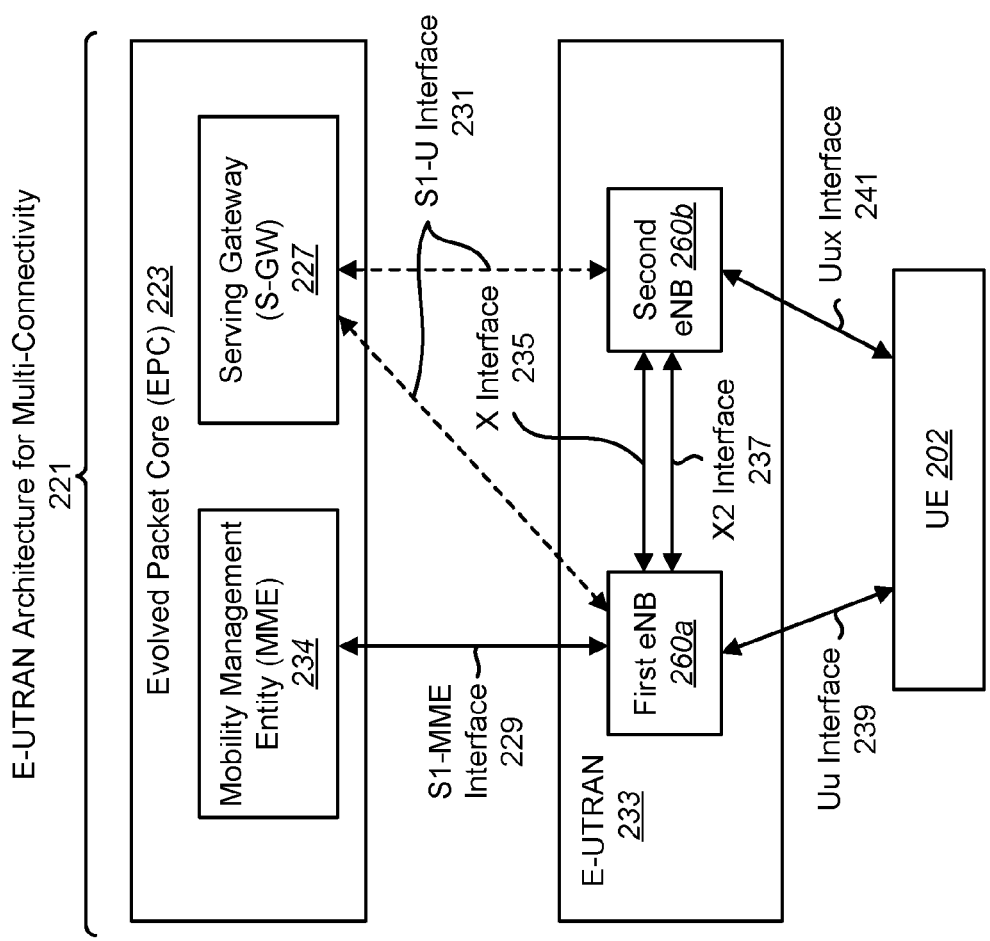
FIG. 2 is a block diagram illustrating configurations of E-UTRAN architecture in which systems and methods for dual-connectivity operation may be implemented.

FIG. 2 is a block diagram illustrating configurations of E-UTRAN architecture 221 in which systems and methods for uplink transmission power control may be implemented. The UE 202 described in connection with FIG. 2 may be implemented in accordance with the UE 102 described in connection with FIG. 1. The eNBs 260a-b described in connection with FIG. 2 may be implemented in accordance with the eNB 160 described in connection with FIG. 1.

The E-UTRAN architecture for multi-connectivity 221 is one example of E-UTRAN architecture that may provide dual-connectivity for a UE 202. In this configuration, the UE 202 may connect to E-UTRAN 233 via a Uu interface 239 and a Uux interface 241. The E-UTRAN 233 may include a first eNB 260a and a second eNB 260b. The eNBs 260a-b may provide the E-UTRA user plane (PDCP/RLC/MAC/PHY) and control plane (RRC) protocol terminations toward the UE 202. The eNBs 260a-b may be interconnected with each other by an X2 interface 237. The S1 interfaces 229, 231 may support a many-to-many relation between MMEs 234, serving gateways 227 and eNBs 260a-b. The first eNB (e.g., MeNB) 260a and the second eNB (e.g., SeNB) 260b may also be interconnected with each other by means of one or more X interfaces 235, which may or may not be the same as the S1-MME 229 and/or X2 interface 237.

The eNBs 260 may host a variety of functions. For example, the eNBs 260 may host functions for radio resource management (e.g., radio bearer control, radio admission control, connection mobility control, dynamic allocation of resources to UEs 202 in both uplink and downlink (scheduling)). The eNBs 260 may also perform IP header compression and encryption of user data stream; selection of an MME 234 at UE 202 attachment when no routing to an MME 234 can be determined from the information provided by the UE 202; and routing of user plane data toward the serving gateway 227. The eNBs 260 may additionally perform scheduling and transmission of paging messages (originated from the MME 234); scheduling and transmission of broadcast information (originated from the MME or operation and maintenance (O&M)); measurement and measurement reporting configuration for mobility and scheduling; and scheduling and transmission of the public warning system (PWS) (which may include the earthquake and tsunami warning system (ETWS) and commercial mobile alert system (CMAS)) messages (originated from the MME 234). The eNBs 260 may further perform closed subscriber group (CSG) handling and transport level packet marking in the uplink.

The MME 234 may host a variety of functions. For example, the MME 234 may perform Non-Access Stratum (NAS) signaling; NAS signaling security; access stratum (AS) security control; inter core network (CN) node signaling for mobility between 3GPP access networks; and idle mode UE Reachability (including control and execution of paging retransmission). The MME 234 may also perform tracking area list management (for a UE 202 in idle and active mode); packet data network gateway (PDN GW) and S-GW selection; MME 234 selection for handovers with MME 234 change; and Serving GPRS Support Node (SGSN) selection for handovers to 2G or 3G 3GPP access networks. The MME 234 may additionally host roaming, authentication and bearer management functions (including dedicated bearer establishment). The MME 234 may provide support for PWS (which includes ETWS and CMAS) message transmission, and may optionally perform paging optimization.

The S-GW 227 may also host the following functions. The S-GW 227 may host the local mobility anchor point for inter-eNB 260 handover. The S-GW 227 may perform mobility anchoring for inter-3GPP mobility; E-UTRAN idle mode downlink packet buffering and initiation of network triggered service request procedure; lawful interception; and packet routing and forwarding. The S-GW 227 may also perform transport level packet marking in the uplink and the downlink; accounting on user and QoS Class Identifier (QCI) granularity for inter-operator charging; and uplink (UL) and downlink (DL) charging per UE 202, packet data network (PDN), and QCI.

The radio protocol architecture of E-UTRAN 233 may include the user plane and the control plane. The user plane protocol stack may include PDCP, RLC, MAC and PHY sublayers. The PDCP, RLC, MAC and PHY sublayers (terminated at the eNB 260*a* on the network) may perform functions (e.g., header compression, ciphering, scheduling, ARQ and HARQ) for the user plane. PDCP entities are located in the PDCP sublayer. RLC entities are located in the RLC sublayer. MAC entities are located in the MAC sublayer. The PHY entities are located in the PHY sublayer.

The control plane may include a control plane protocol stack. The PDCP sublayer (terminated in eNB 260*a* on the network side) may perform functions (e.g., ciphering and integrity protection) for the control plane. The RLC and MAC sublayers (terminated in eNB on the network side) may perform the same functions as for the user plane. The RRC (terminated in eNB 260*a* on the network side) may perform the following functions. The RRC may perform broadcast functions, paging, RRC connection management, radio bearer (RB) control, mobility functions, UE 202 measurement reporting and control. The NAS control protocol (terminated in MME 234 on the network side) may perform, among other things, evolved packet system (EPS) bearer management, authentication, evolved packet system connection management (ECM)-IDLE mobility handling, paging origination in ECM-IDLE and security control.

The first eNB 260*a* and the second eNB 260*b* may be connected by the S1 interfaces 229, 231 to the EPC 223. The first eNB 260*a* may be connected to the MME 234 by the S1-MME interface 229. In one configuration, the second eNB 260*b* may be connected to the serving gateway 227 by the S1-U interface 231 (as indicated by a dashed line). The first eNB 260*a* may behave as the MME 234 for the second eNB 260*b* so that S1-MME interface 229 for the second eNB 260*b* may be connected (via the X interface 235, for instance) between the first eNB 260*a* and the second eNB 260*b*. Therefore, the first eNB 260*a* may appear to the second eNB 260*b* as an MME 234 (based on the S1-MME interface 229) and an eNB 260 (based on the X2 interface 237).

In another configuration, first eNB 260*a* may also be connected to the serving gateway 227 by the S1-U interface 231 (as indicated by a dashed line). Therefore, the second eNB 260*b* may not be connected to the EPC 223. The first eNB 260*a* may appear to the second eNB 260*b* as an MME 234 (based on the S1-MME interface 229), an eNB (based on the X2 interface 237), and an S-GW 227 (based on the S1-U interface 231). This architecture 221 may provide a single node S1 interface 229, 231 (e.g., connection) with the EPC 223 for the first eNB 260*a* and the second eNB 260*b*. By the single node connection with EPC 223, MME 234 S-GW 227, a change (e.g., handover) could be mitigated as long as the UE 202 is in the coverage of the first eNB 260*a*.

Figure 3:
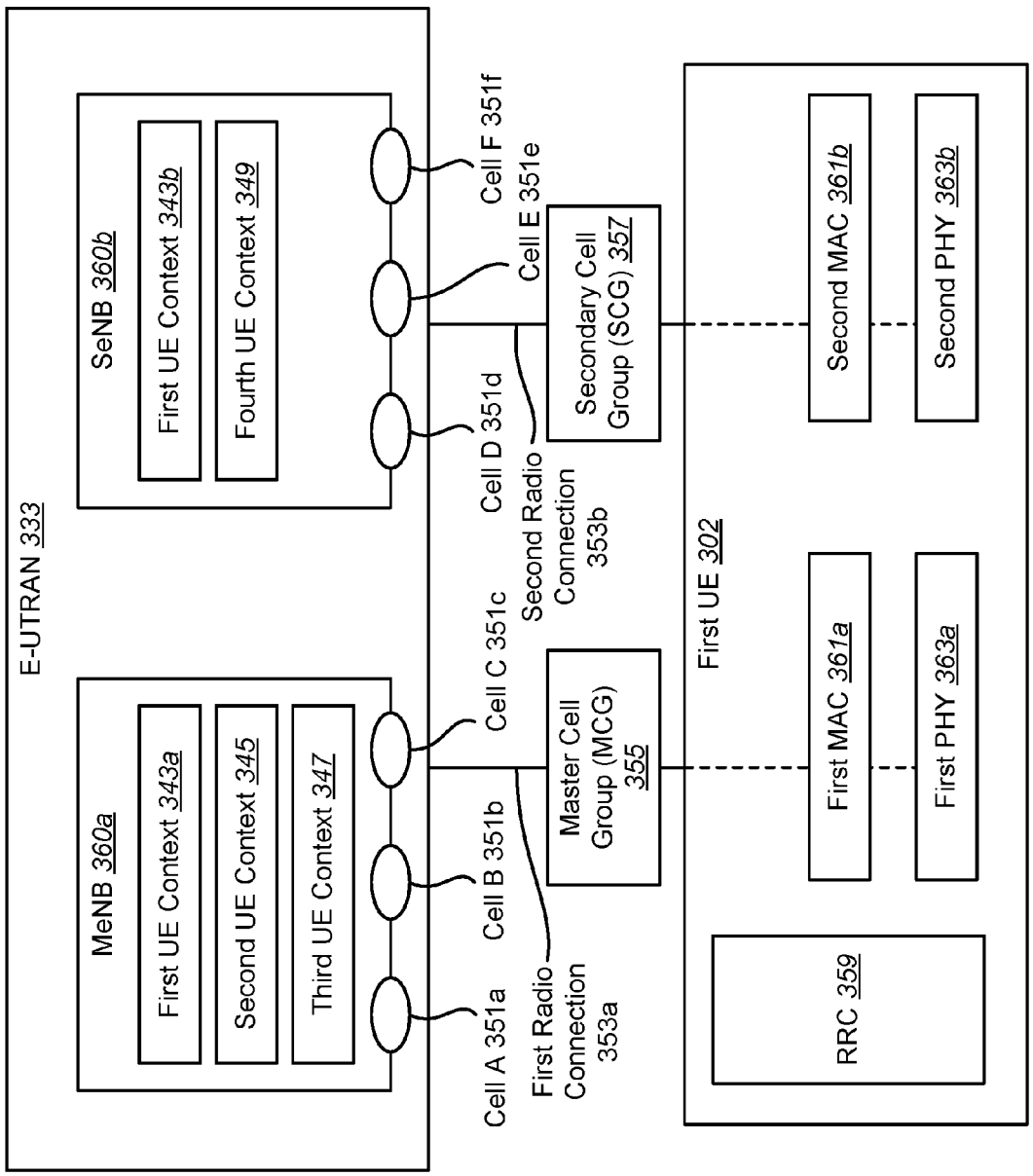
FIG. 3 is a block diagram illustrating one configuration of an E-UTRAN and a UE in which systems and methods for dual-connectivity operation may be implemented.

FIG. 3 is a block diagram illustrating one configuration of an E-UTRAN 333 and a UE 302 in which systems and methods for uplink transmission power control may be implemented. The UE 302 and the E-UTRAN 333 described in connection with FIG. 3 may be implemented in accordance with corresponding elements described in connection with at least one of FIGS. 1 and 2.

In traditional carrier aggregation, a single eNB 360 is assumed to provide multiple serving cells 351 for a UE 302. Even in scenarios where two or more cells 351 may be aggregated (e.g., a macro cell aggregated with remote radio head (RRH) cells 351), the cells 351 may be controlled (e.g., scheduled) by a single eNB 360. However, in a small cell deployment scenario, each eNB 360 (e.g., node) may have its own independent scheduler. To utilize radio resources of both eNBs 360*a-b*, the UE 302 may connect to both eNBs 360*a-b*.

When carrier aggregation is configured, the UE 302 may have one RRC connection with the network. A radio interface may provide carrier aggregation. During RRC connection establishment, re-establishment and handover, one serving cell 351 may provide NAS mobility information (e.g., a tracking area identity (TAI)). During RRC connection re-establishment and handover, one serving cell 351 may provide a security input. This cell 351 may be referred to as the primary cell (PCell). In the downlink, the component carrier corresponding to the PCell may be the downlink primary component carrier (DL PCC), while in the uplink it may be the uplink primary component carrier (UL PCC).

Depending on UE 302 capabilities, one or more SCells may be configured to form together with the PCell a set of serving cells 351*a-f*. In the downlink, the component carrier corresponding to a SCell may be a downlink secondary component carrier (DL SCC), while in the uplink it may be an uplink secondary component carrier (UL SCC).

The configured set of serving cells 351*a-f* for the UE 302, therefore, may consist of one PCell and one or more SCells. For each SCell, the usage of uplink resources by the UE 302 (in addition to the downlink resources) may be configurable. The number of DL SCCs configured may be larger than or equal to the number of UL SCCs and no SCell may be configured for usage of uplink resources only.

From a UE 302 viewpoint, each uplink resource may belong to one serving cell 351. The number of serving cells 351 that may be configured depends on the aggregation capability of the UE 302. The PCell may only be changed using a handover procedure (e.g., with a security key change and a random access channel (RACH) procedure). The PCell may be used for transmission of the PUCCH. Unlike the SCells, the PCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by an RRC 359. At intra-LTE handover, RRC 359 may also add, remove or reconfigure SCells for usage with a target PCell. When adding a new SCell, dedicated RRC signaling may be used for sending all required system information of the SCell (e.g., while in connected mode, UEs 302 need not acquire broadcasted system information directly from the SCells).

However, to connect to both eNBs 360 that have different schedulers, dual-connectivity between the UE 302 and E-UTRAN 333 may be required. In addition to Release-11 operation, a UE 302 operating according to Release-12 may be configured with dual-connectivity (which may also be called multi-connectivity, inter-node carrier aggregation, inter-node radio aggregation, multi-flow, multi-cell cluster, multi-Uu, etc.).

The UE 302 may connect to E-UTRAN 333 with multiple Uu interfaces 239, 241, if configured. For example, a UE 302 may be configured to establish an additional radio interface (e.g., radio connection 353) by using one radio interface (radio connection 353). Hereafter, one eNB 360 is referred to as a master eNB (MeNB) 360a, which may also be called a primary eNB (PeNB). Another eNB 360 is referred to as s secondary eNB (SeNB) 360b. The Uu interface 239 (which may be called primary Uu interface) is a radio interface between the UE 302 and the MeNB 360a. The Uux interface 241 (which may be called secondary Uu interface) is a radio interface between the UE 302 and the SeNB 360b.

In one configuration, the UE 302 may not be required to be aware of the MeNB 360a and SeNB 260b as long as the UE 302 is aware of multiple Uu interfaces 239, 241 (i.e., MCG 355 and SCG 357) with the E-UTRAN 333. Also, the E-UTRAN 333 may provide multiple Uu interfaces with the same or different eNBs 360.

In one configuration, the MeNB 360a and SeNB 360b could be the same eNB 360. The multiple Uu interfaces 239, 241 (e.g., dual-connectivity) can be achieved even by a single eNB 360. The UE 302 may be able to connect more than one Uux interface 241 (e.g., Uu1, Uu2, Uu3 . . . ). Each Uu interface 239, 241 can have carrier aggregation. Therefore, the UE 302 may be configured with more than one set of serving cells 351 in case of carrier aggregation (CA). In dual connectivity (i.e, two sets), one set of serving cells 351 may be the MCG 355, another set of serving cells may be the SCG 357.

Multiple Uu interfaces 239, 241 are described herein, but this functionality could be realized by a single Uu interface 239 depending on the definition of Uu interface 239. Dual-connectivity may be realized by a single Uu interface 239 or a single radio interface depending on the definition of the interface. A radio interface can be defined as an interface between a UE 302 and the E-UTRAN 333, but not an interface between the UE 302 and an eNB 360. For example, one radio interface can be defined as an interface between a UE 302 and the E-UTRAN 333 with dual-connectivity. Therefore, the difference between the Uu 239 and Uux 241 above may be considered as a characteristic of cells 351. The Uu interface 239 and the Uux interface 241 may be rephrased by a set A of cell(s) and a set B of cell(s), respectively. Also, a radio interface and an additional radio interface can be rephrased by a master cell group (MCG) 355 and secondary cell group (SCG) 357, respectively.

In some implementations, the E-UTRAN 333 may include a MeNB 360a and a SeNB 360b. The UE 302 may communicate with the MeNB 360a via a first radio connection 353a. The UE 302 may communicate with the SeNB 360b via the second radio connection 353b. While FIG. 3 depicts one first radio connection 353a and one second radio connection 353b, the UE 302 may be configured with one first radio connection 353a and one or more second radio connections 353b. The MeNB 360a and SeNB 360b may be implemented in accordance with the eNB 160 described in connection with FIG. 1.

The MeNB 360a may provide multiple cells 351a-c for connection to one or more UEs 302. For example, the MeNB 360a may provide cell A 351a, cell B 351b and cell C 351c. Similarly, the SeNB 360b may provide multiple cells 351d-f. The UE 302 may be configured to transmit/receive on one or more cells (e.g., cell A 351a, cell B 351b and cell C 351c) for the first radio connection 353a (e.g., a master cell group (MCG) 355). The UE 302 may also be configured to transmit/receive on one or more other cells (e.g., cell D 351d, cell E 351e and cell F 351f) for the second radio connection 353b (e.g., a secondary cell group (SCG) 357).

The MCG 355 may contain one PCell and one or more optional SCell(s). The SCG 357 may contain one PCell-like cell (that may be called PCell, primary SCell (PSCell), secondary PCell (SPCell), PCellscg, SCG PCell, etc.) and one or more optional SCell(s). If the UE 302 is configured to transmit/receive on multiple cells 351a-f for a radio connection 353a-b, a carrier aggregation operation may be applied to the radio connection 353a-b. In one configuration, each radio connection 353 may be configured with a primary cell and no, one or more secondary cell(s). In another configuration, at least one radio connection 353 may be configured with a primary cell and no, one or more secondary cell(s) and the other radio connections 353 may be configured with one or more secondary cell(s). In yet another configuration, at least one radio connection 353 may be configured with a primary cell and no, one or more secondary cell(s) and the other radio connections 353 may be configured with a PCell-like cell and no, one or more secondary cell(s).

One MAC entity 361 and one PHY entity 363 may be mapped to one cell group 130. For example, a first MAC entity 361a and a first PHY entity 363a may be mapped to the MCG 355. Similarly, a second MAC entity 361b and a second PHY entity 363b may be mapped to the SCG 357. The UE 302 may be configured with one MCG 355 (e.g., the first radio connection 353a) and optionally one or more SCG(s) 357 (e.g., the second radio connection 353b).

The MeNB 360a manages and stores UE contexts for the first radio connection 353a. The UE contexts may be RRC contexts (e.g., configurations, configured cells 351, security information, etc.), QoS information and UE 302 identities for each UE 302 for configured cells 351 for the UE 302. For example, the MeNB 360a may manage and store a first UE context 343a, a second UE context 345 and a third UE context 347.

The SeNB 360b manages and stores UE contexts for the second radio connection 353b for each UE 302 for configured cells 351 for the UE 302. For example, the SeNB 360b may manage and store the first UE context 343b and a fourth UE context 349. An eNB 360 can behave as both MeNB 360a and SeNB 360b. Therefore, the eNB 360 may manage and store UE contexts for UEs 302 connected to a first radio connection 353a and UE contexts for UEs 302 connected to a second radio connection 353b.

In some implementations, the MAC entities 361a-b may have an interface with an RRC entity 359. The RRC entity 359 may receive RRC messages (e.g., RRC connection reconfiguration message, connection control message, handover command, etc.) from a RRC entity (not shown) of the E-UTRAN 333. The RRC entity 359 may also transmit RRC messages (e.g. RRC connection reconfiguration complete message) to the RRC entity (not shown) of the E-UTRAN 333.

Figure 4:
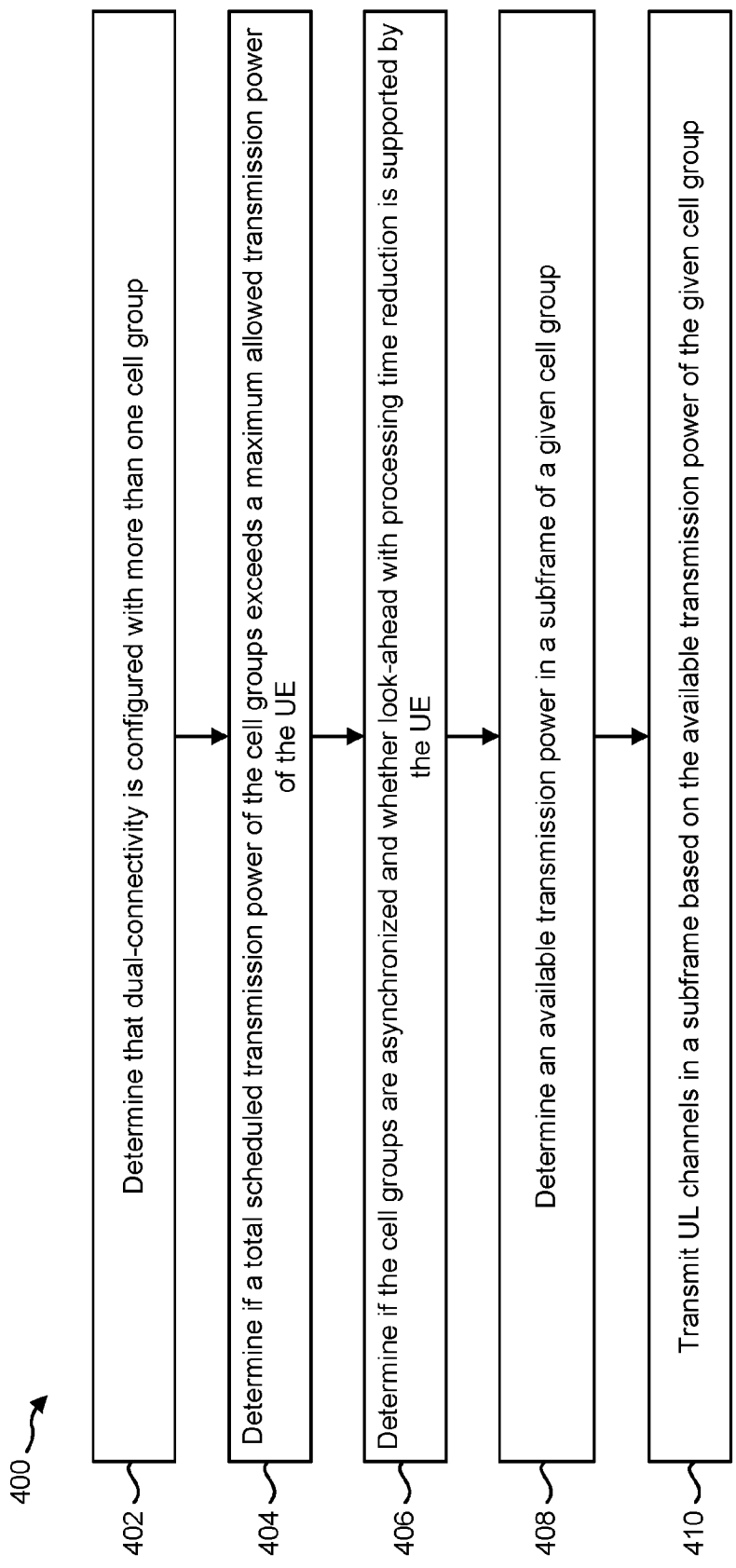
FIG. 4 is a flow diagram illustrating one implementation of a method for uplink transmission power control by a UE.

FIG. 4 is a flow diagram illustrating one implementation of a method 400 for uplink transmission power control by a UE 102. In dual-connectivity, a UE 102 may be connected to one or more cell groups 130. If the UE 102 supports dual-connectivity, the UE 102 may determine 402 that dual-connectivity is configured with more than one cell group 130. For example, the UE 102 may be connected to an MCG 355 and an SCG 357. In one configuration, a first cell group 130a may be the MCG 355 and the other cell group 130b may be the SCG 357. In another configuration, the first cell group 130a may be the SCG 357 and the other cell group 130b may be the MCG 355.

For the uplink transmissions in a subframe n, the UE 102 may determine 404 if a total scheduled transmission power of the cell groups 130 exceeds a maximum allowed transmission power of the UE 102 ($P_{cmax}$). If the total scheduled transmission power of the cell groups 130 does not exceed the maximum allowed transmission power of the UE 102, then the UE 102 is in a power unlimited case. In this case, simultaneous uplink transmission from the cell groups 130 (e.g., the MCG 355 and the SCG 357) should be performed independently according to scheduled uplink transmission powers and existing priority rules within each cell group 130.

In any portion of a subframe, if the total scheduled transmission power of the cell groups 130 exceeds the maximum allowed transmission power of the UE 102, then the UE 102 is in a power limited case. In this case, if the total scheduled uplink transmission powers on the cell groups 130 exceed the maximum allowed transmission power of the UE 102, the UE 102 may allocate power to each cell group 130. By allocating power to each cell group 130, the UE 102 may keep the total transmission power within the power limit.

The UE 102 may determine 406 if the cell groups 130 (i.e., the first cell group 130a and the other cell group 130b) are asynchronized and whether look-ahead with processing time reduction is supported by the UE 102. With asynchronized cell groups 130, the subframes in the different cells are not aligned. The subframes of one cell group 130 and another cell group 130 may have a time difference more than a defined threshold. Therefore, the subframe of one cell group 130 overlaps with two subframes of another cell group 130 in asynchronized cell groups 130. In other words, in asynchronized cell groups 130, a given subframe n of the first cell group 130a overlaps with an earlier subframe m−1 and a later subframe m of the other cell group 130b. An example of asynchronized cell groups 130 is described in connection with FIG. 6.

Two types of operation may be considered based on whether look-ahead with processing time reduction is supported by the UE 102 or not. With look-ahead operation, the transmission of an uplink subframe in one cell group 130 may consider the type of channels or information to be transmitted in a later subframe of another cell group 130. Because the minimum association timing for an LTE configuration is 4 ms, look-ahead may have a reduced processing time as short as 3 ms.

In LTE, the minimum time between a PDSCH or PUSCH transmission and corresponding HARQ-ACK response, and between a uplink scheduling PDCCH/EPDCCH to the uplink transmission is 4 ms. Thus, the processing time can be regarded as 4 ms. Look ahead is defined as the UE 102 knows the actual UL transmission(s) in the latter part of the overlap portion. Thus, the minimum time for the above processing will be less than 4 ms. In the worst case scenario, the processing time could be as short as 3 ms.

The UE 102 may determine 408 an available transmission power in a subframe n ($P_{available\_subframe\_n}$) of a given cell group 130. The UE 102 may allocate power to the uplink channels 121 in subframe n of a first cell group 130a by replacing $P_{cmax}$ with $P_{available\_subframe\_n}$ for the first cell group 130a. If processing time reduction and look-ahead are not supported by the UE 102, the transmission of an uplink subframe in one cell group 130 may not consider the type of channels or information to be transmitted in a later subframe of another cell group 130. However, some information can be used to determine whether there are potential transmissions in a later subframe m of the other cell group 130b to determine power reservation for the other cell group 130b. For example, the UE 102 may determine whether there are potential UL transmissions in the later subframe m of the other cell group 130b based on semi-static information or dynamic information.

For semi-static information, for a later subframe m in the other cell group 130b, there may be a potential UL transmission in certain cases of a semi-static configuration. In a first case of semi-static information, the UE 102 may determine that the later subframe m of the other cell group 130b has no uplink allocation based on time division duplexing (TDD) uplink/downlink (UL/DL) configurations of the serving cells.

In a second case of semi-static information, the UE 102 may determine that a later subframe m of the other cell group 130b has an uplink subframe allocation. To determine whether there is a potential UL transmission in the later subframe m of the other cell group 130b, the UE 102 may determine whether there is a semi-statically configured transmission in the later subframe of the other cell group 130b. The semi-statically configured transmission may include at least one of periodic channel state information (CSI) and semi-persistent scheduling (SPS).

In a third case of semi-static information, the UE 102 may determine that the later subframe of the other cell group 130b has an uplink subframe allocation. To determine whether there is a potential UL transmission in the later subframe m of the other cell group 130b, the UE 102 may determine whether there is a semi-statically configured physical random access channel (PRACH) or scheduling request (SR) resources in the later subframe m of the other cell group 130b.

Dynamic information or signaling may also indicate whether there is a potential UL transmission in a subframe m for a cell group 130. In a first case of dynamic information, the UE 102 may determine that the cells in the other cell group 130b include one or more eIMTA cells. To determine whether there is no potential UL transmission in the later subframe m of the other cell group 130b, the UE 102 may determine that a valid UL/DL configuration is received in reconfiguration downlink control information (DCI) that configures the later subframe of the other cell group 130b as a DL subframe.

In a second case of determining that there is no potential UL transmission in the later subframe m based on dynamic information, the UE 102 may determine whether the later subframe m of the other cell group 130b has no HARQ association linkage or has a minimum downlink HARQ association linkage greater than 4 milliseconds. The UE 102 may also determine whether the later subframe m of the other cell group 130b has an uplink scheduling linkage greater than 4 milliseconds. The UE 102 may further determine whether there is no PDSCH transmitted in any subframes included in a DL association set of the later subframe m. The UE 102 may additionally determine whether there is no PUSCH scheduled in the later subframe m.

In a third case of determining that there is no potential UL transmission in the later subframe m based on dynamic information, the UE 102 may determine that the cells in the other cell group 130b include eIMTA cells. The UE 102 may also determine that the later subframe m of the other cell group 130b has a minimum downlink HARQ association linkage of 4 milliseconds or an uplink scheduling linkage of 4 milliseconds. The UE 102 may further determine that there is no PDSCH transmitted in any subframe earlier than the fourth subframe before the later subframe (e.g., m−4) in the DL association set of the later subframe m. The UE 102 may additionally determine that a valid UL/DL configuration is received in a reconfiguration DCI that subframe m−4 as a UL subframe.

If the UE 102 determines that there is no potential UL transmission in the later subframe m of the other cell group 130b, the UE 102 may determine the available transmission power in the given subframe n of the first cell group 130a as the maximum allowed transmission power of the UE 102 reduced by the power allocated in the later subframe m of the other cell group 130b. However, if the UE 102 determines that there is a potential UL transmission in the later subframe m of the other cell group 130b, the UE 102 may determine the available transmission power in the given subframe n of the first cell group 130a as the maximum allowed transmission power of the UE 102 reduced by the maximum value of the power allocated in the later subframe m of the other cell group 130b or the guaranteed power of the other cell group 130b.

The UE 102 may transmit 410 UL channels 121 in a subframe based on the available transmission power of the given cell group 130. In one configuration, the UE 102 may transmit 410 UL channels 121 in the given subframe n of the first cell group 130a by replacing the maximum allowed transmission power of the UE 102 ($P_{cmax}$) with the available transmission power ($P_{available\_subframe\_n}$) of the first cell group 130a.

Figure 5:
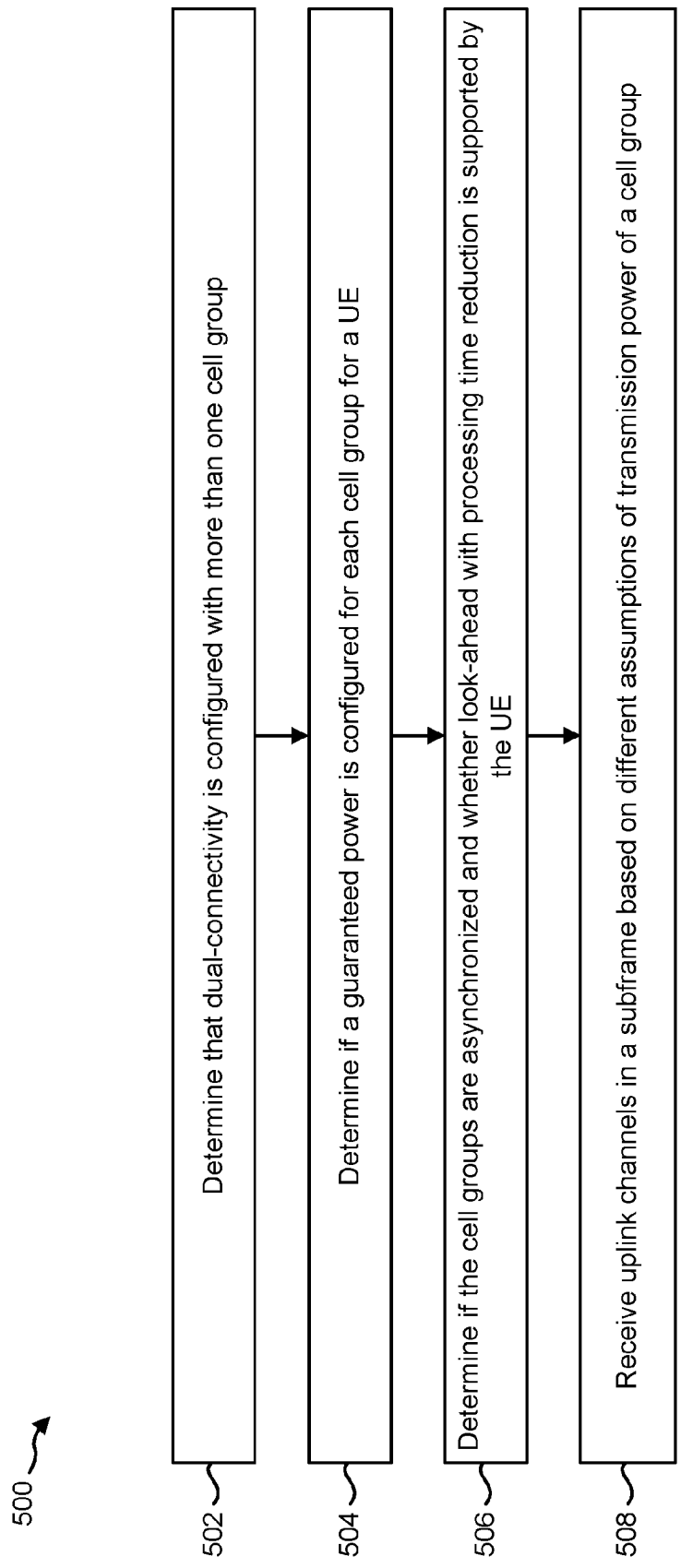
FIG. 5 is a flow diagram illustrating one implementation of a method for uplink transmission power control by an eNB.

FIG. 5 is a flow diagram illustrating one implementation of a method 500 for uplink transmission power control by an eNB 160. In dual-connectivity, an eNB 160 may provide multiple cells 351 for connection to one or more UEs 102. The eNB 160 may provide a radio connection 353 for the one or more cells 351. The one or more cells 351 may form a cell group 130. If the eNB 160 supports dual-connectivity, the eNB 160 may determine 502 that dual-connectivity is configured with more than one cell group 130. For example, the eNB 160 may provide a first cell group 130a and another eNB 160 may provide the other cell group 130b. The cell group 130 may be an MCG 355 or an SCG 357.

The eNB 160 may determine 504 if a guaranteed power is configured for each cell group 130 for a UE 102. If a cell group 130 is configured with a minimum guaranteed power, then the UE 102 may reserve a certain amount of power for the other cell group 130 for a potential uplink transmission on the other cell group 130b.

The eNB 160 may determine 506 if the cell groups are asynchronized and whether look-ahead with processing time reduction is supported by the UE 102. With asynchronized cell groups 130, the subframes in the different cell are not aligned. The subframes of one cell group 130 and another cell group 130 may have a time difference more than a defined threshold. Therefore, the subframe of one cell group 130 overlaps with two subframes of another cell group 130 in asynchronized cell groups 130. In other words, in asynchronized cell groups 130, a given subframe n of the first cell group 130a overlaps with an earlier subframe m−1 and a later subframe m of the other cell group 130b. An example of asynchronized cell groups 130 is described in connection with FIG. 6.

Two types of operation may be considered based on whether look-ahead with processing time reduction is supported by the UE 102. With look-ahead operation, the transmission of an uplink subframe in one cell group 130 may consider the type of channels or information to be transmitted in a later subframe of another cell group 130.

The eNB 160 may receive 508 uplink channels 121 in a subframe based on an available transmission power of a given cell group 130. The eNB 160 may receive 508 the uplink channels 121 based on different assumptions of the available transmission power. If the total scheduled transmission power of the cell groups 130 does not exceed the maximum allowed transmission power of the UE 102, then the UE 102 is in a power unlimited case. In this case, simultaneous uplink transmission from each cell group 130 (e.g., the MCG 355 and the SCG 357) should be performed independently by the UE 102. The eNB 160 may expect to receive the uplink channels 121 on the cell group 130 with the scheduled power.

However, if the total transmission power of the cell groups 130 exceeds the maximum allowed transmission power of the UE 102, the cell groups are asynchronized, and processing time reduction and look-ahead are not supported by the UE 102, then the available transmission power of the first cell group 130a may be determined based on whether there is a potential UL transmission in the later subframe of the other cell group 130b.

If processing time reduction and look-ahead are not supported by the UE 102, the transmission of an uplink subframe in one cell group 130 may not consider the type of channels or information to be transmitted in a later subframe of another cell group 130. However, the eNB 160 may consider different assumptions on whether there are UL transmissions in the subframe overlapping region of the other cell group 130b for uplink reception. In one case, the eNB 160 may expect to receive the uplink channel 121 with the scheduled power (e.g., if there is no uplink transmission in any overlapping part of the subframe). In another case, the eNB 160 may expect to receive the uplink channel 121 with lower than scheduled power or the uplink channel 121 may be dropped due to insufficient power (e.g., if there are uplink transmissions in overlapping part of the subframe that reduces the available power for the uplink transmission of the subframe on the given cell group 130).

It should be noted that the eNB 160 may not be able to get semi-static or dynamic information from other eNB 160 in dual-connectivity operation. In this case, the eNB 160 cannot estimate whether there is transmission to the other eNB 160 or not, or whether the UE 102 is operate in power limited case or not. Thus, the eNB 160 can expect to receive: (1) the uplink channel 121 with scheduled power; (2) the uplink channel 121 with a reduced power due to power limitation and transmission on the other cell group 130b; or (3) a dropped uplink channel 121 due to power limitation and transmission on the other cell group 130b.

Figure 6:
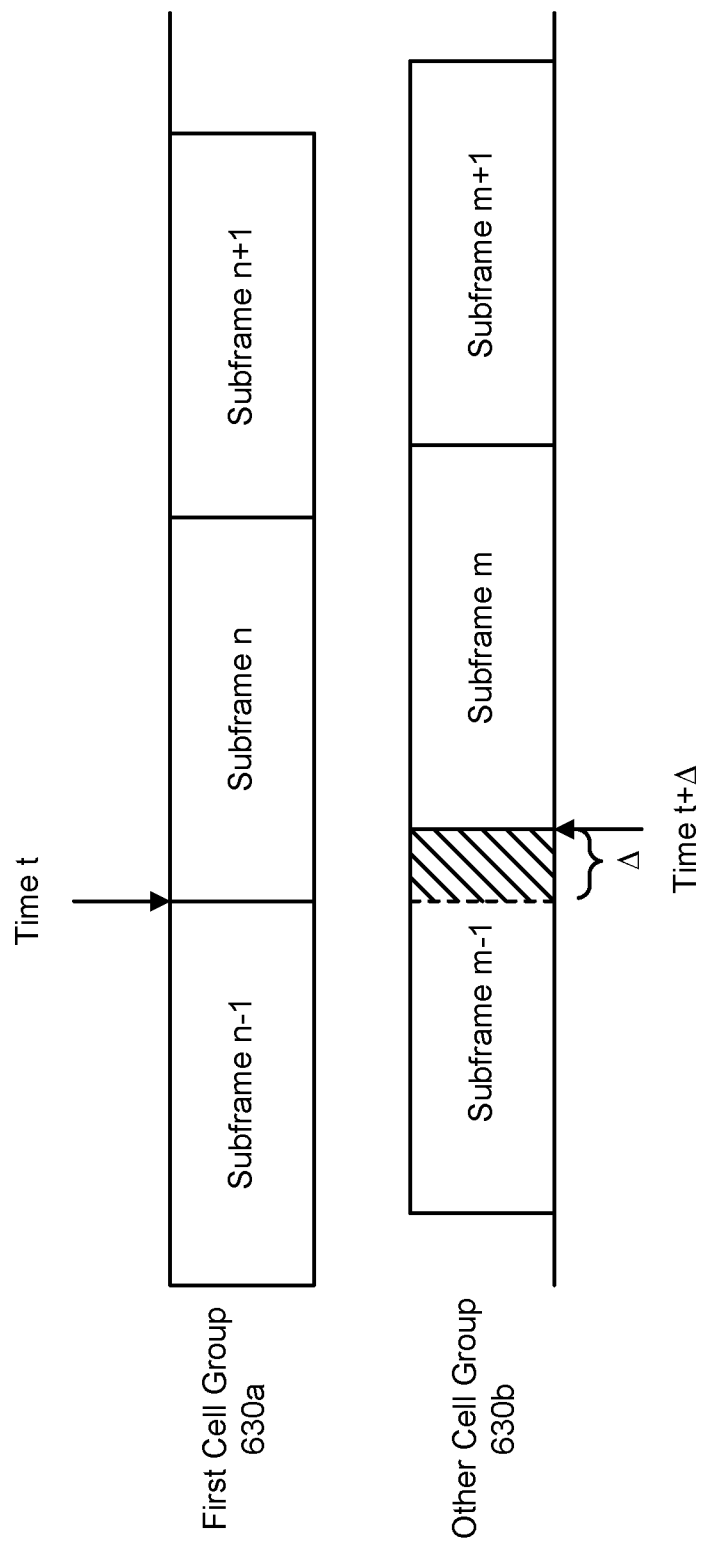
FIG. 6 illustrates asynchronized cell groups in dual-connectivity.

FIG. 6 illustrates asynchronized cell groups 130 in dual-connectivity. The subframes in a first cell group 630a are not aligned with the subframes in the other cell group 630b. In one configuration, the first cell group 630a may be an MCG 355 and the other cell group 630b may be an SCG 357.

In the first cell group 630a, for the UL transmission in subframe n at time t, the UE 102 may consider not only the overlapping part of subframe m−1 on the other cell group 630b, but also a later subframe m on the other cell group 630b. The amount of overlap between the earlier subframe m−1 and the later subframe m may be defined as A. The value of A can be as long as approximately 1 ms. However, the UE 102 may not know what information and power requirement is at time t+Δ.

Figure 7:
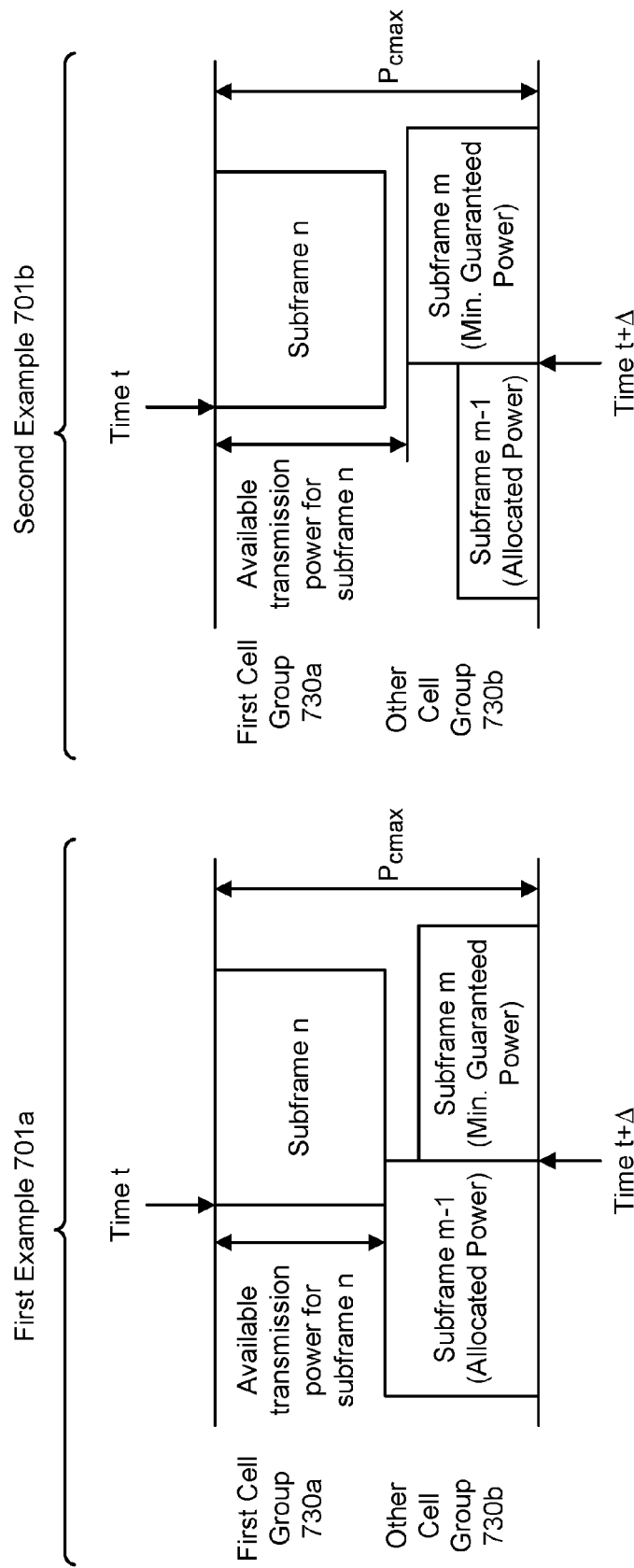
FIG. 7 illustrates different examples for determining an available transmission power.

FIG. 7 illustrates different examples 701 for determining an available transmission power. The subframes in a first cell group 730a are not aligned with the subframes in the other cell group 730b. In other words, the cell groups are asynchronized cell groups.

If a minimum guaranteed power allocation for a secondary eNB 160 (P_SeNB) and/or primary eNB 160 (P_MeNB) are configured (i.e., P_SeNB>=0, P_MeNB>=0; and P_SeNB+P_MeNB<=100%) and if look-ahead is not assumed, the UE 102 should reserve P_SeNB and/or P_MeNB towards each eNB 160 if there is potential uplink transmission. However, if the UE 102 knows it does not have a transmission in the other cell group 730b in overlapped subframes based on at least semi-static information (e.g., a TDD UL/DL configuration), the UE 102 may not reserve the power for that cell group 730b. For the remaining power, an earlier transmission is higher priority.

For a UL transmission, the transmission power should be constant in the subframe. Therefore, in a no look-ahead case, the transmission power of a cell group 730 may be scheduled as follows. Assuming that subframe n of a first cell group 730a overlaps with subframe m−1 and subframe m of the other cell group 730b, if there is a potential UL transmission in subframe m of the other cell group 730b, then a minimum guaranteed power should be reserved for the other cell group 730b. Thus, the available power for the UL transmission in subframe n of the first cell group 730a is given according to Equation (1):

$$P_{available\_subframe\_n} = P_{cmax} - \max\begin{pmatrix} P_{allocated\_subframe\_m-1\_otherCG}, \\ P_{min\_otherCG} \end{pmatrix} \quad (1)$$

In Equation (1), $P_{available\_subframe\_n}$ is the available transmission power in the given subframe n of the first cell group 730a. $P_{cmax}$ is the maximum allowed transmission power of the UE 102. $P_{allocated\_subframe\_m-1\_otherCG}$ is the power allocated on the earlier subframe m−1 of the other cell group 730b. $P_{min\_otherCG}$ is the minimum guaranteed power configured for the other cell group 730b (i.e. P_MeNB if the other cell group 730b is the MCG 355 and P_SeNB if the other cell group 730b is the SCG 357).

FIG. 7 shows two examples 701 of no look-ahead power allocation if there is a potential UL transmission in a later subframe m of another cell group 730b. In the first example 701a, the allocated power on the earlier subframe m−1 of the other cell group ($P_{allocated\_subframe\_m-1\_otherCG}$) is greater than the minimum guaranteed power ($P_{min\_otherCG}$). Therefore, in this example, the available transmission power ($P_{available\_subframe\_n}$) is determined by $P_{cmax} - P_{allocated\_subframe\_m-1\_otherCG}$.

In the second example 701b, the allocated power on the earlier subframe m−1 of the other cell group ($P_{allocated\_subframe\_m-1\_otherCG}$) is less than the minimum guaranteed power ($P_{min\_otherCG}$). Therefore, in this example, the available transmission power ($P_{available\_subframe\_n}$) is determined by $P_{cmax} - P_{min\_otherCG}$.

If the UE 102 knows that it does not have a transmission in the other cell group 730b in overlapped later subframe m, the UE 102 may not reserve the power for the other cell group 730b. In this case, the available transmission power in the given subframe n of the first cell group 730a is given according to Equation (2).

$$P_{available\_subframe\_n} = P_{cmax} - P_{allocated\_subframe\_m-1\_otherCG} \quad (2)$$

Figure 8:
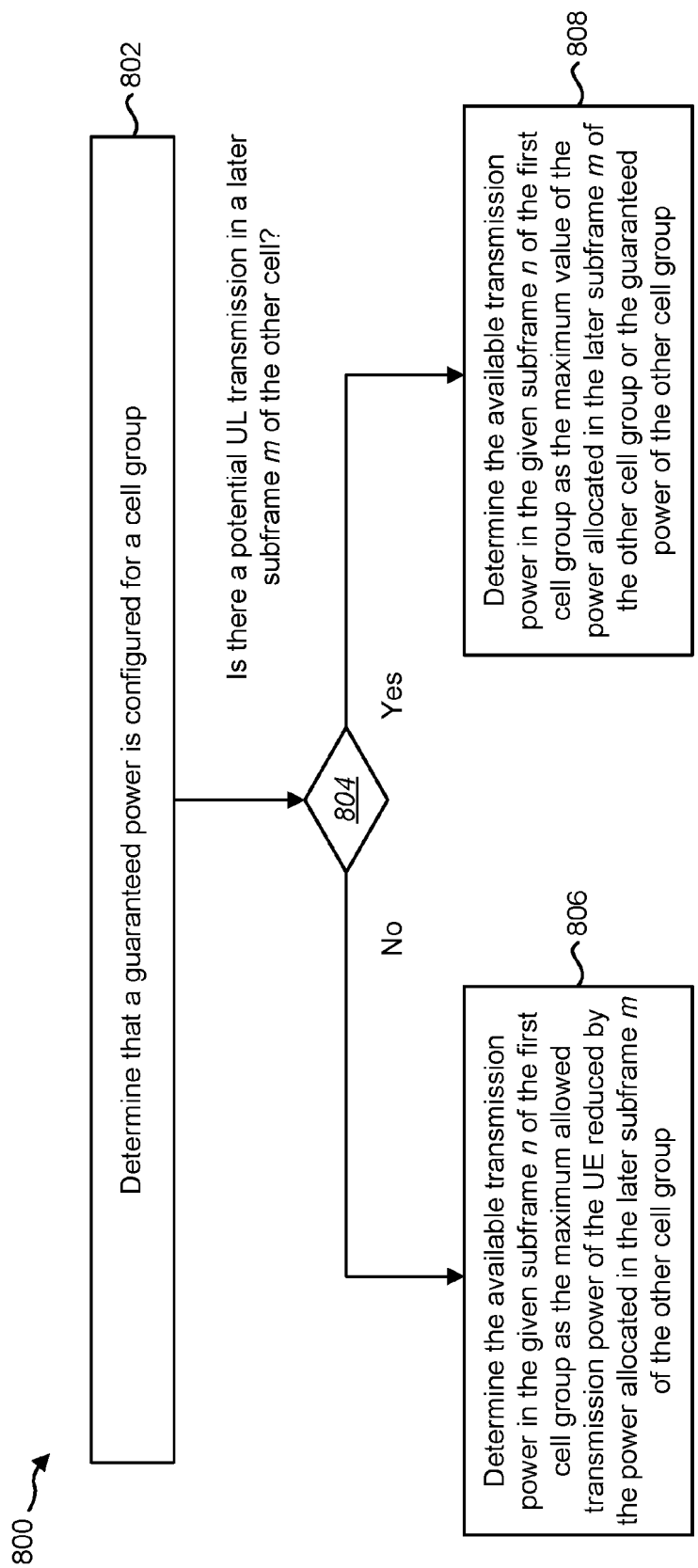
FIG. 8 is a flow diagram illustrating a detailed implementation of a method for uplink transmission power control by a UE.

FIG. 8 is a flow diagram illustrating a detailed implementation of a method 800 for uplink transmission power control by a UE 102. UE 102 may support dual-connectivity. In this case, the UE 102 may determine that dual-connectivity is configured with more than one cell group 130. For example, the UE 102 may be connected to a first cell group 130a and another cell group 130b.

The UE 102 may determine 802 that a guaranteed power is configured for a cell group 130. If a cell group 130 is configured with a minimum guaranteed power, then the UE 102 may reserve a certain amount of power for the other cell group 130b for a potential uplink transmission on the other cell group 130b.

The UE 102 may determine 804 whether there is a potential UL transmission in a later subframe m of the other cell group 130b. For a subframe m in a cell group 130, there may be a potential UL transmission in certain cases of semi-static configuration. On a PCell or an sPCell, a semi-persistent scheduling (SPS) may be scheduled in the later subframe m. Periodic CSI reporting may be scheduled in the later subframe m. Additionally, periodic sounding reference signals (SRS) may be scheduled in the later subframe m. Moreover, if the later subframe m is configured with PRACH resources, the UE 102 may transmit PRACH in the later subframe m.

In other cases, the UL transmission can be dynamically scheduled by downlink control information (DCI) format 0/4 for a PUSCH transmission, a physical HARQ indicator channel (PHICH) indication, or an aperiodic CSI triggering, which is determined by the UL scheduling timing. The UL transmission can be HARQ-ACK feedback corresponding to PDSCH transmissions in earlier subframes, which is determined by the DL HARQ-ACK timing.

For a cell group 130 following FDD timing (e.g., a cell group 130 with an FDD cell as the PCell or sPCell in FDD CA or TDD-FDD CA), a fixed 4 ms association timing may be used for both DL HARQ-ACK and UL scheduling timing. In this case, if processing time reduction cannot be assumed for all UEs 102, no look-ahead can be applied. There is a potential UL scheduling or DL transmission in subframe m−4, for which the UE 102 may need to perform PUSCH transmission or HARQ-ACK feedback in subframe m. Thus, if no look-ahead is applied, for a UL subframe n in a first cell group 130*a*, if the other cell group 130*b* is following FDD timing, the guaranteed power should be reserved for the other cell group 130*b*.

However, if a cell group 130 following TDD timing (e.g., a cell group 130 with a TDD cell as the PCell or sPCell in TDD CA or TDD-FDD CA), the DL and UL scheduling and HARQ-ACK timing may have variable subframe intervals. Furthermore, the DL timing may follow a DL reference configuration and UL timing may follow a UL reference configuration. The DL and UL reference configurations may be the same or different.

For a TDD serving cell, the semi-static information (e.g., the TDD UL/DL configuration), can be used to determine if there is a potential uplink transmission on a cell group 130. It should be noted that if a serving cell is configured with TDD, the subframes that are configured as DL will not have any uplink transmission on the cell.

Another type of semi-static resource may include the PRACH and SR resources. Based on the random access channel parameters (e.g., PRACH configuration and frequency position), if a subframe is configured for PRACH, the UE 102 should reserve the guaranteed power since PRACH has higher priority than other channels in the same cell group 130. Similarly, if a subframe is configured with an SR resource in a cell group 130, the UE 102 should reserve the guaranteed power for the cell group 130. The SR should have higher priority than other UCI, such as HARQ-ACK and CSI.

Dynamic information or signaling may also indicate whether there is a potential UL transmission in a subframe for a cell group 130. A first type of dynamic information may include a valid TDD UL/DL configuration received in a reconfiguration downlink control information (DCI) for a TDD cell supporting dynamic UL/DL configuration with traffic adaptation (i.e., an eIMTA TDD cell). In this case, the subframes that are configured as DL in the UL reference configuration will not have any UL transmission. The UL reference configuration of an eIMTA cell is the SIB1 configuration if it is a PCell or sPCell or the UL/DL configuration indicated by RRCCommon if it is a SCell. If a valid TDD UL/DL configuration is received in a reconfiguration DCI for the eIMTA cell, the DL subframes indicated by the reconfiguration DCI will not have any UL transmission.

A second type of dynamic information includes DL HARQ-ACK timing and UL scheduling timing. Except the channels with semi-persistent scheduling (e.g., periodic CSI and SPS), other UL transmissions may be dynamically scheduled by the eNB 160 or dynamically scheduled corresponding to a DL transmission. The DL HARQ-ACK timing and UL scheduling timing can dynamically determine if there is a potential UL transmission.

In the case of DL HARQ-ACK timing, a TDD cell or an FDD SCell in TDD-FDD CA may follow a PDSCH HARQ-ACK timing based on a DL reference configuration. The HARQ-ACK timing is defined by a DL association set for a UL subframe.

For a normal TDD cell following its own UL/DL configuration for PDSCH HARQ-ACK timing, a DL association set K is a set of M elements $\{k_0, k_1 \ldots k_{M-1}\}$ depending on the subframe m and the UL/DL configuration of the cell. The DL association set K: $\{k_0, k_1 \ldots k_{M-1}\}$ for TDD is defined in Table 1 (from 3GPP TS 36.213, table 10.1.3.1-1).

TABLE 1

| UL/DL Configuration | Subframe m | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

If a TDD cell is an enhanced interference mitigation and traffic adaptation (eIMTA) cell, and a DL HARQ reference is configured by RRC signaling, the DL association set K (defined in Table 1) is a set of M elements $\{k_0, k_1 \ldots k_{M-1}\}$ depending on the subframe m and the DL HARQ reference configuration.

For TDD CA with different UL/DL configurations, a TDD cell may follow a DL reference UL/DL configuration. For a PCell, the DL reference DL/UL configuration may be the PCell's UL/DL configuration. For a TDD SCell, the DL reference UL/DL configuration may be determined by the pair of {UL/DL configuration of PCell, UL/DL configuration of the serving cell}. If a cell is an eIMTA cell, the DL HARQ reference configuration of the eIMTA cell is used to determine the DL reference UL/DL configuration of the serving cell.

In TDD-FDD CA, if the PCell is a TDD cell, then for self scheduling an FDD SCell HARQ timing may be defined by a DL association set according to the PCell or sPCell UL/DL configuration of the given cell group 130, as shown in Table 2. The DL association set K: $\{k_0, k_1 \ldots k_{M-1}\}$ for FDD with a TDD PCell and self-scheduling is defined in Table 2.

TABLE 2

| TDD PCell UL-DL Conf. | Subframe m | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, [5] | [5], [4] | 4 | — | — | 6, [5] | [5], [4] | 4 |
| 1 | — | — | 7, 6 | [6], [5], 4 | — | — | — | 7, 6 | [6], [5], 4 | — |
| 2 | — | — | 8, 7, 6, [5], 4 | — | — | — | — | 8, 7, 6, [5], 4 | — | — |
| 3 | — | — | 11, [10], [9], [8], 7, 6 | 6, 5 | 5, 4 | — | — | — | — | — |

TABLE 2-continued

| TDD PCell UL-DL Conf. | 0 | 1 | 2 | 3 | 4 | 5 | 6 | 7 | 8 | 9 |
|---|---|---|---|---|---|---|---|---|---|---|
| 4 | — | — | 12, 11, [10], [9], 8, 7 | 7, 6, 5, 4 | — | — | — | — | — | — |
| 5 | — | — | 13, 12, 11, [10], 9, 8, 7, 6, 5, 4 | — | — | — | — | — | — | — |
| 6 | — | — | [8], 7 | 7, [6] | [6], 5 | — | — | 7 | 7, [6], [5] | — |

The brackets in Table 2 refer to the new added associations for a FDD cell following the PCell TDD UL/DL configuration compared with corresponding TDD DL association set for the given PCell TDD UL/DL configuration in Table 1. For cross-carrier scheduling, the DL HARQ timing of the scheduled serving cell may follow the PCell timing or sPCell timing of the given cell group 130. The PCell timing or sPCell timing may be defined as the DL HARQ timing determined according to the PCell's or SPCell's system information block type 1 (SIB1) UL/DL configuration, or the DL-reference HARQ timing of the PCell or sPCell for eIMTA.

Figure 10:
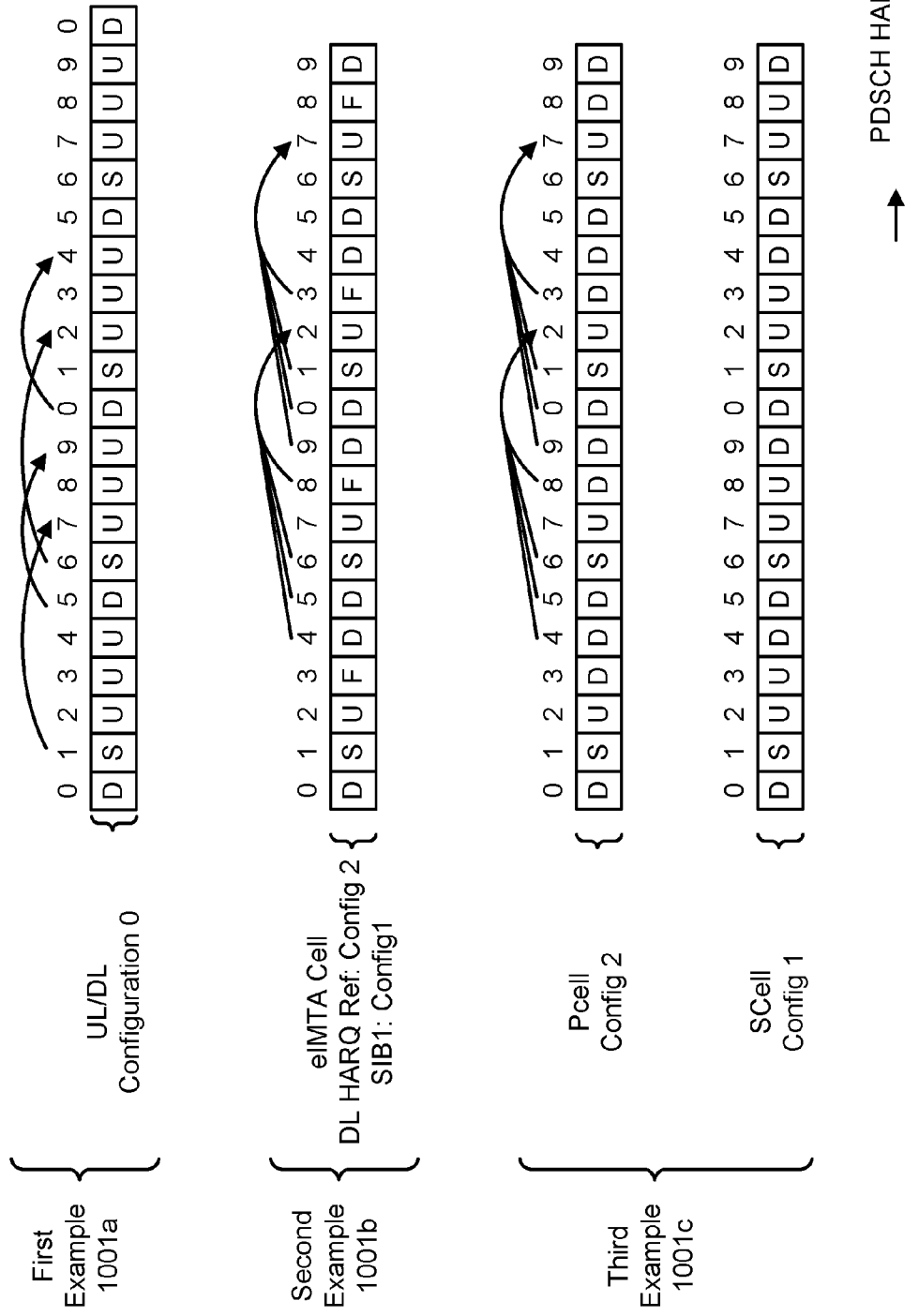
FIG. 10 illustrates various examples for determining whether there is a potential UL transmission in the later subframe of a cell group.

There are different cases in which the UE 102 may know whether there is a potential HARQ-ACK reporting on an uplink subframe. In a first case, some UL subframes may not have a DL association set. Therefore, these UL subframes will not be used for HARQ-ACK reporting. The number of UL subframes in the DL reference UL/DL configuration of a TDD serving cell is the same or smaller than the number of UL subframes of the corresponding TDD serving cell. Thus, if there are UL subframes without HARQ association timing, no HARQ-ACK will be reported in these subframes. FIG. 10 shows several examples where one or more UL subframes do not have a DL association set.

In a second case in which the UE 102 may know whether there is a potential HARQ-ACK reporting on an uplink subframe based on DL HARQ-ACK timing, the UE 102 may consider the distance between the last subframe in the DL association set and the UL subframe.

The smallest value in set K for uplink subframe m may be defined as $k_{min}$. If $k_{min}$ is greater than 4, then the UE 102 may have more than 4 ms to determine whether there is PDSCH scheduled and whether HARQ-ACK feedback is needed in subframe m. If there is no SPS or PDSCH scheduled in any subframe of the DL subframe set, then the UE 102 knows there will be no HARQ-ACK reporting in subframe m. Thus, without a processing time reduction, look-ahead may be assumed in these uplink subframes to determine whether HARQ-ACK reporting is required on the given subframe.

If $k_{min}$ of the DL association set for subframe m is 4, without a processing time reduction, a UE 102 cannot perform look-ahead because there may be PDSCH scheduled in subframe m–$k_{min}$, and a HARQ-ACK response may be needed on subframe m.

Based on the DL association set indexes, for a serving cell following a TDD reference configuration for HARQ timing, Table 3 and Table 4 summarize the subframes that have a minimum association linkage greater than 4 ms that may be predicted whether a HARQ-ACK reporting is performed in the given UL subframe m. The UL subframes with a minimum DL HARQ feedback of 4 ms (indicated by *4) may not be predicted without a processing time reduction and look-ahead. The DL association set for a serving cell following a DL reference configuration is defined in Table 3.

TABLE 3

| UL/DL Configuration | 0 | 1 | 2 | 3 | 4 | 5 | 6 | 7 | 8 | 9 |
|---|---|---|---|---|---|---|---|---|---|---|
| 0 | — | — | 6 | — | *4 | — | — | 6 | — | *4 |
| 1 | — | — | 7, 6 | *4 | — | — | — | 7, 6 | *4 | — |
| 2 | — | — | 8, 7, *4, 6 | — | — | — | — | 8, 7, *4, 6 | — | — |
| 3 | — | — | 7, 6, 11 | 6, 5 | 5, *4 | — | — | — | — | — |
| 4 | — | — | 12, 8, 7, 11 | 6, 5, *4, 7 | — | — | — | — | — | — |
| 5 | — | — | 13, 12, 9, 8, 7, 5, *4, 11, 6 | — | — | — | — | — | — | — |
| 6 | — | — | 7 | 7 | 5 | — | — | 7 | 7 | — |

According to Table 3, if a serving cell has a DL reference configuration of UL/DL configuration 0, then UL subframes 2 and 7 have a DL HARQ feedback linkage of 6 ms. Therefore, HARQ-ACK reporting for subframes 2 and 7 can be predicted. UL subframes 3 and 8 have no DL HARQ feedback linkage. Therefore, UL subframes 3 and 8 do not have HARQ-ACK reporting. UL subframes 4 and 9 have a DL HARQ feedback linkage of 4 ms. Therefore, the HARQ-ACK reporting for subframes 4 and 9 cannot be predicted without look-ahead and processing time reduction.

If a serving cell has a DL reference configuration of UL/DL configuration 1, then UL subframes 2 and 7 have a minimum DL HARQ feedback linkage of 6 ms. Therefore, HARQ-ACK reporting for subframes 2 and 7 can be predicted. UL subframes 3 and 8 have DL HARQ feedback linkage of 4 ms. Therefore, the HARQ-ACK reporting for subframes 3 and 8 cannot be predicted without look-ahead and processing time reduction.

If a serving cell has a DL reference configuration of UL/DL configuration 2, UL subframes 2 and 7 have a minimum DL HARQ feedback linkage of 4 ms. Therefore, the HARQ-ACK reporting for subframes 2 and 7 cannot be predicted without look-ahead and processing time reduction.

If a serving cell has a DL reference configuration of UL/DL configuration 3, UL subframe 2 and 3 have a minimum DL HARQ feedback of 6 ms and 5 ms, respectively. Therefore, HARQ-ACK reporting for subframes 2 and 3 can be predicted. UL subframe 4 has a minimum DL HARQ feedback linkage of 4 ms. Therefore, the HARQ-ACK reporting for subframe 4 cannot be predicted without look-ahead and processing time reduction.

If a serving cell has a DL reference configuration of UL/DL configuration 4, then UL subframe 2 has a minimum DL HARQ feedback of 7 ms. Therefore, HARQ-ACK reporting for subframe 2 can be predicted. UL subframe 3 has a minimum DL HARQ feedback linkage of 4 ms. Therefore, the HARQ-ACK reporting for subframe 3 cannot be predicted without look-ahead and processing time reduction.

If a serving cell has a DL reference configuration of UL/DL configuration 5, then UL subframe 2 has a minimum DL HARQ feedback linkage of 4 ms. Therefore, the HARQ-ACK reporting for subframe 2 cannot be predicted without look-ahead and processing time reduction.

If a serving cell has a DL reference configuration of UL/DL configuration 6, then UL subframes 2 and 7, subframes 3 and 8 and subframe 4 have a minimum DL HARQ feedback linkage of 7 ms, 7 ms and 5 ms, respectively. Therefore HARQ-ACK reporting for subframes 2 and 7, subframes 3 and 8 and subframe 4 can be predicted.

The DL association set for a FDD cell in FDD-TDD CA with TDD PCell and self-scheduling is defined in Table 4.

If a serving cell has a DL reference configuration of UL/DL configuration 3, UL subframe 2 and 3 have a minimum DL HARQ feedback of 6 ms and 5 ms, respectively. Therefore, HARQ-ACK reporting for subframes 2 and 3 can be predicted. UL subframe 4 has a minimum DL HARQ feedback linkage of 4 ms. Therefore, the HARQ-ACK reporting for subframe 4 cannot be predicted without look-ahead and processing time reduction.

If a serving cell has a DL reference configuration of UL/DL configuration 4, then UL subframe 2 has a minimum DL HARQ feedback of 7 ms. Therefore, HARQ-ACK reporting for subframe 2 can be predicted. UL subframe 3 has a minimum DL HARQ feedback linkage of 4 ms. Therefore, the HARQ-ACK reporting for subframe 3 cannot be predicted without look-ahead and processing time reduction.

If a serving cell has a DL reference configuration of UL/DL configuration 5, then UL subframe 2 has a minimum DL HARQ feedback linkage of 4 ms. Therefore, the HARQ-ACK reporting for subframe 2 cannot be predicted without look-ahead and processing time reduction.

If a serving cell has a DL reference configuration of UL/DL configuration 6, then UL subframes 2 and 7, subframe 3 and subframes 8 and 4 have a minimum DL HARQ feedback linkage of 7 ms, 6 ms and 5 ms, respectively. Therefore HARQ-ACK reporting for subframes 2 and 7, subframe 3 and subframes 8 and 4 can be predicted.

TABLE 4

| TDD PCell | Subframe m | | | | | | | | |
|---|---|---|---|---|---|---|---|---|---|
| UL/DL Conf. | 0 | 1 2 | 3 | 4 | 5 | 6 7 | 8 | 9 |
| 0 | — | — 6, [5] | [5], [*4] | *4 | — | — 6, [5] | [5], [*4] | *4 |
| 1 | — | — 7, 6 | [6], [5] *4 | — | — | — 7, 6 | [6], [5], *4 | — |
| 2 | — | — 8, 7, 6, [5], *4 | — | — | — | — 8, 7, 6, [5], *4 | — | — |
| 3 | — | — 11, [10], [9], [8], 7, 6 | 6, 5 | 5, *4 | — | — — | — | — |
| 4 | — | — 12, 11, [10], [9], 8, 7 | 7, 6, 5, *4 | — | — | — — | — | — |
| 5 | — | — 13, 12, 11, [10], 9, 8, 7, 6, 5, *4 | — | — | — | — — | — | — |
| 6 | — | — [8], 7 | 7, [6] | [6], 5 | — | — 7 | 7, [6], [5] | — |

According to Table 4, if a serving cell has a DL reference configuration of UL/DL configuration 0, then UL subframes 2 and 7 have a DL HARQ feedback linkage of 5 ms. Therefore, HARQ-ACK reporting for subframes 2 and 7 can be predicted. UL subframes 3, 4, 8 and 9 have a DL HARQ feedback linkage of 4 ms. Therefore, the HARQ-ACK reporting for subframes 3, 4, 8 and 9 cannot be predicted without look-ahead and processing time reduction.

If a serving cell has a DL reference configuration of UL/DL configuration 1, then UL subframes 2 and 7 have a minimum DL HARQ feedback linkage of 6 ms. Therefore, HARQ-ACK reporting for subframes 2 and 7 can be predicted. UL subframes 3 and 8 have DL HARQ feedback linkage of 4 ms. Therefore, the HARQ-ACK reporting for subframes 3 and 8 cannot be predicted without look-ahead and processing time reduction.

If a serving cell has a DL reference configuration of UL/DL configuration 2, UL subframes 2 and 7 have a minimum DL HARQ feedback linkage of 4 ms. Therefore, the HARQ-ACK reporting for subframes 2 and 7 cannot be predicted without look-ahead and processing time reduction.

Even if $k_{min}$ of the DL association set for subframe m is 4, for an eIMTA TDD cell, if the subframe with $k_{min}=4$ in the DL association set is dynamically configured as a UL subframe, the UE 102 may predict whether a HARQ-ACK reporting is needed in the given UL subframe m. Referring to the second example in FIG. 10, the eIMTA cell has an SIB1 configuration of UL/DL configuration 1 and a RRC configured DL HARQ reference of UL/DL configuration 2. If the UE 102 receives a valid UL/DL configuration in a reconfiguration DCI that configured subframe 3 and 8 to UL subframes, the UE 102 can predict whether a HARQ-ACK report is needed in a UL subframe without a processing time reduction.

The second type of dynamic information may include UL scheduling timing. Besides semi-static scheduled UL transmissions (e.g., SPS; periodic CSI and periodic SRS; and dynamic HARQ-ACK reporting for PDSCH transmissions), a UL transmission can be scheduled by a PUSCH scheduling DCI following a UL scheduling timing.

A TDD cell may follow a UL reference configuration for PUSCH scheduling. The UL reference configuration may have the same number or more UL subframes than the number of UL subframes of the UL/DL configuration of the serving cell.

The UE 102 may, upon detection of a PDCCH/EPDCCH with uplink DCI format and/or a PHICH transmission in subframe m intended for the UE 102, adjust the corresponding PUSCH transmission in subframe m+k, with k given in Table 5 (from 3GPP TS 36.213, Table 8-2) according to the PDCCH/EPDCCH and PHICH information.

TABLE 5

| TDD UL/DL Configuration | subframe number m | | | | | | | | | |
|---|---|---|---|---|---|---|---|---|---|---|
| | 0 | 1 | 2 | 3 | 4 | 5 | 6 | 7 | 8 | 9 |
| 0 | | | *4 | 6 | | | | *4 | 6 | |
| 1 | | | 6 | | | *4 | | | 6 | *4 |
| 2 | | | | *4 | | | | | *4 | |
| 3 | *4 | | | | | | | | *4 | *4 |
| 4 | | | | | | | | | *4 | *4 |
| 5 | | | | | | | | | *4 | |
| 6 | 7 | 7 | | | | 7 | 7 | | | 5 |

In Table 5, for a UL subframe m with association links greater than 4 ms, the UE 102 knows whether there is PUSCH transmission in subframe m without processing time reduction below 4 ms. Thus, look-ahead can be assumed for PUSCH transmissions in these UL subframes.

For a UL subframe m with association links equal to 4 ms (as indicated by *4 in Table 5), the UE 102 may not know whether there is a PUSCH transmission in subframe m without a processing time reduction below 4 ms. Thus, look-ahead cannot be assumed for PUSCH transmissions in these UL subframes.

If a serving cell has a DL reference configuration of UL/DL configuration 0, then UL subframes 2 and 7 have a UL scheduling linkage of 6 ms. Therefore, a PUSCH transmission for subframes 2 and 7 can be predicted. UL subframes 3 and 8 have a UL scheduling linkage of 7 ms. Therefore, a PUSCH transmission for subframes 3 and 8 can be predicted. UL subframes 4 and 9 have a UL scheduling linkage of 4 ms. Therefore, a PUSCH transmission for subframes 4 and 9 cannot be predicted without look-ahead and processing time reduction.

If a serving cell has a DL reference configuration of UL/DL configuration 1, then UL subframes 2 and 7 have a UL scheduling linkage of 6 ms. Therefore, a PUSCH transmission for subframes 2 and 7 can be predicted. UL subframes 3 and 8 have a UL scheduling linkage of 4 ms. Therefore, a PUSCH transmission for subframes 3 and 8 cannot be predicted without look-ahead and processing time reduction.

If a serving cell has a DL reference configuration of UL/DL configuration 2, UL subframes 2 and 7 have a UL scheduling linkage of 4 ms. Therefore, a PUSCH transmission for subframes 2 and 7 cannot be predicted without look-ahead and processing time reduction.

If a serving cell has a DL reference configuration of UL/DL configuration 3, UL subframes 2, 3 and 4 have a UL scheduling of 4 ms, respectively. Therefore, a PUSCH transmission for subframes 2, 3 and 4 cannot be predicted without look-ahead and processing time reduction.

If a serving cell has a DL reference configuration of UL/DL configuration 4, then UL subframes 2 and 3 have a UL scheduling of 4 ms. Therefore, a PUSCH transmission for subframes 2 and 3 cannot be predicted without look-ahead and processing time reduction.

If a serving cell has a DL reference configuration of UL/DL configuration 5, then UL subframe 2 has a UL scheduling linkage of 4 ms. Therefore, a PUSCH transmission for subframe 2 cannot be predicted without look-ahead and processing time reduction.

If a serving cell has a DL reference configuration of UL/DL configuration 6, then UL subframes 2 and 7, subframes 3 and 8 and subframe 4 have a UL scheduling linkage of 7 ms, 7 ms and 5 ms, respectively. Therefore a PUSCH transmission for subframes 2 and 7, subframes 3 and 8 and subframe 4 can be predicted.

As described herein, for a cell group 130 with a TDD PCell or sPCell, for a subframe m, the UE 102 may evaluate if an uplink transmission can be predicted without a processing time reduction for both PDSCH HARQ-ACK reporting and UL scheduling.

If the UE 102 determines 804 that there is no potential UL transmission on the later subframe m of the other cell group 130*b*, the UE 102 may determine 806 the available transmission power in the given subframe n of the first cell group 130*a* as the maximum allowed transmission power of the UE 102 reduced by the power allocated in the later subframe of the other cell group. To determine the available transmission power for subframe n of a cell group 130, if a UL subframe m of the other cell group 130*b* can be predicted for both PDSCH HARQ-ACK reporting and UL scheduling without a processing time reduction below 4 ms, as described above, and if the UE 102 knows there will be no HARQ-ACK reporting or PUSCH transmission in subframe m, no guaranteed power needs to be reserved for the other cell group 130*b*. Thus, the available transmission power for subframe n of the first cell group 130*a* is given by Equation (2) above.

If the UE 102 determines 804 that there is a potential UL transmission on the later subframe m of the other cell group 130*b*, the UE 102 may determine the available transmission power in the given subframe n of the first cell group 130*a* according to different approaches. If a UL subframe m of the other cell group 130*b* can be predicted for both PDSCH HARQ-ACK reporting and UL scheduling without processing time reduction below 4 ms, as described above, and if the UE 102 knows there will be HARQ-ACK reporting or a PUSCH transmission in subframe m of the other cell group 130*b*, two approaches can be considered.

In a first approach, the UE 102 may determine 808 the available transmission power in the given subframe n of the first cell group 130*a* as the maximum value of the power allocated in the later subframe m of the other cell group 130*b* or the guaranteed power of the other cell group 130*b*. In this approach, the UE 102 may reserve a minimum guaranteed power for subframe m of the other cell group 130*b*. The available transmission power for subframe n of the first cell group 130*a* is given by Equation (1) above.

In a second approach, the UE 102 performs transmit power control the same way as a synchronized case and with a look-ahead case. In this approach, the uplink channels 121 on both cell groups 130 may be evaluated based on priority rules.

If the UE 102 cannot know whether there will be HARQ-ACK reporting or PUSCH transmission in subframe m without a processing time reduction, guaranteed power should be reserved for the other cell group 130*b*. In this case, the available transmission power for subframe n of the first cell group 130*a* is given by Equation (1) above.

In yet another configuration, the UE 102 may relax the guaranteed power requirement. If the UE 102 cannot know whether there will be HARQ-ACK reporting or a PUSCH transmission in subframe m of the other cell group 130b without a processing time reduction, guaranteed power normally should be reserved for the other cell group 130b. Thus, the available transmit power for subframe n of the first cell group 130a is given by Equation (1) above.

However, in most cases, there may not be any UL transmission on the other cell group 130b. In these cases, the power is wasted and cannot be used for the UL transmission on the first cell group 130a. With a HARQ-ACK process, PUSCH data can be retransmitted in a later subframe without causing significant performance degradation. Therefore, if the minimum guaranteed power can be reserved for important UCI information, then the guaranteed power can be relaxed for other UL transmissions (e.g., PUSCH transmission without UCI and SRS).

In an asynchronized case with no processing time reduction for look-ahead, a UE 102 should reserve the minimum guaranteed power for subframe m of the other cell group 130b in the following cases: When the UE 102 knows there will be a HARQ-ACK report on the PUCCH or PUSCH in subframe m because there is at least one subframe scheduled with a PDSCH transmission in the DL association set; When the smallest DL HARQ linkage is 4 ms in the DL association set of subframe m, thus, there is a potential HARQ reporting in subframe m for a PDSCH transmission scheduled in the subframe m−4; When there is a scheduled periodic CSI report in subframe m; When there is a scheduled periodic SRS transmission in subframe m.

Furthermore, the minimum guaranteed power for subframe m of the other cell group 130b may also be reserved if there is a PUSCH transmission scheduled by semi-persistent scheduling (SPS). SPS is normally used for time-sensitive data transmission, such as voice over LTE.

On the other hand, in an asynchronized case and no processing time reduction for look-ahead, a UE 102 may not reserve the minimum guaranteed power for subframe m of the other cell group 130b if the UE 102 knows there will be no HARQ-ACK report in subframe m because there is no PDSCH transmission in any subframe of the DL association set, which has a minimum linkage greater than 4 ms. Even if the cell has a UL scheduling linkage of 4 ms, the cell group 130 of the UE 102 does not need to reserve the guaranteed power because a PUSCH without UCI can be power scaled based on the remaining power. Furthermore, the SRS can also be deprioritized and the minimum guaranteed power can be removed in a subframe if only a periodic SRS transmission is scheduled and there is no potential UCI feedback.

For example, in some cases, more important information may be transmitted in subframe n on the first cell group 130a on a PUCCH or PUSCH, but the remaining power (excluding the guaranteed power) in a later subframe m of the other cell group 130b is not sufficient for the requested power. In this case, the UE 102 may reduce the guaranteed power on the other cell group 130b and allocate more power for the first cell group 130a if the other cell group 130b has a potential PUSCH without UCI or SRS transmission.

Figure 9:
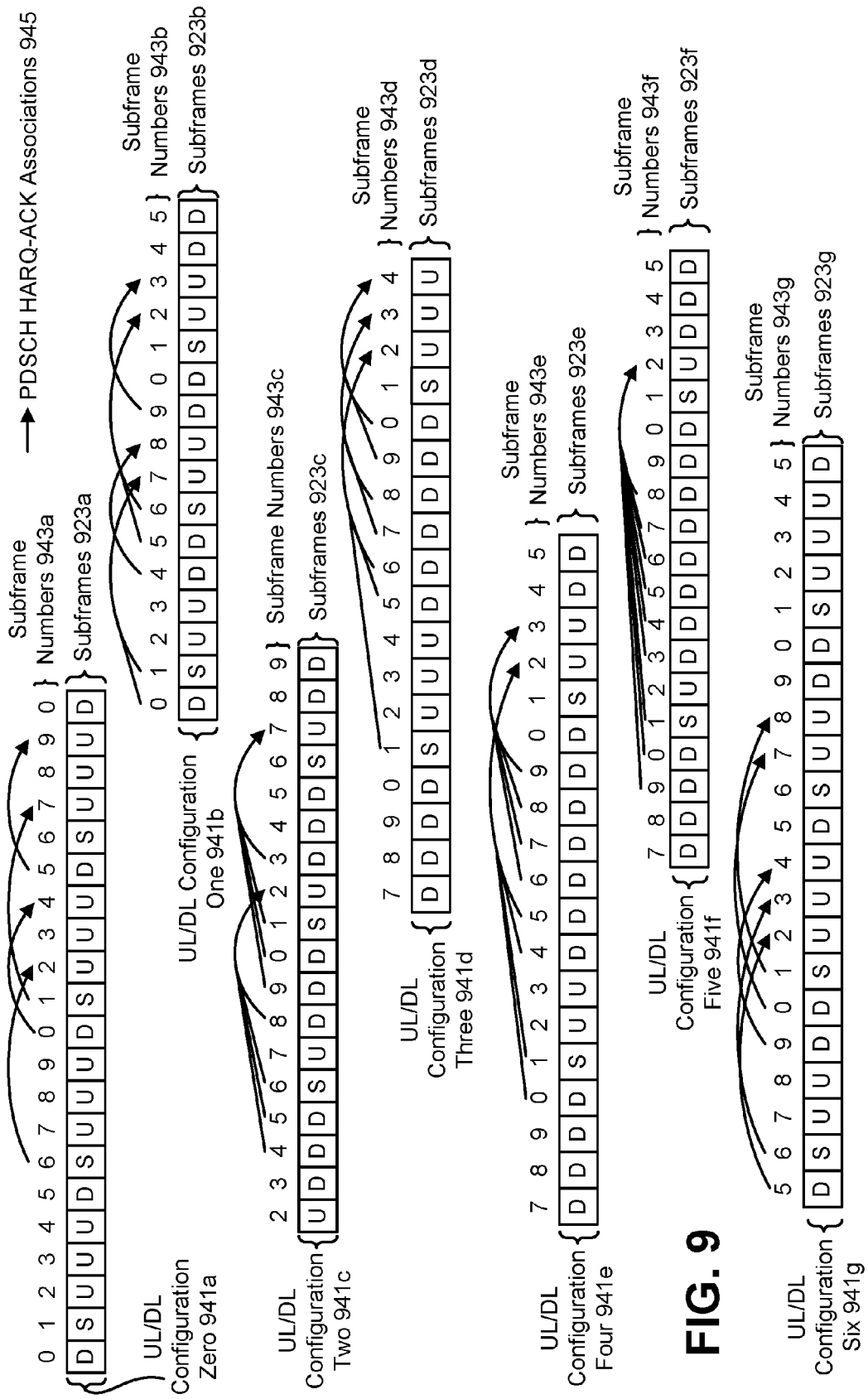
FIG. 9 is a diagram illustrating time division duplexing (TDD) uplink/downlink (UL/DL) configurations in accordance with the systems and methods described herein.

FIG. 9 is a diagram illustrating TDD UL/DL configurations 941a-g in accordance with the systems and methods described herein. In particular, FIG. 9 illustrates UL/DL configuration zero 941a (e.g., "UL/DL configuration 0") with subframes 923a and subframe numbers 943a, UL/DL configuration one 941b (e.g., "UL/DL configuration 1") with subframes 923b and subframe numbers 943b, UL/DL configuration two 941c (e.g., "UL/DL configuration 2") with subframes 923c and subframe numbers 943c and UL/DL configuration three 941d (e.g., "UL/DL configuration 3") with subframes 923d and subframe numbers 943d. FIG. 9 also illustrates UL/DL configuration four 941e (e.g., "UL/DL configuration 4") with subframes 923e and subframe numbers 943e, UL/DL configuration five 941f (e.g., "UL/DL configuration 5") with subframes 923f and subframe numbers 943f and UL/DL configuration six 941g (e.g., "UL/DL configuration 6") with subframes 923g and subframe numbers 943g.

Furthermore, FIG. 9 illustrates PDSCH HARQ-ACK associations 945 (e.g., PDSCH HARQ-ACK feedback on PUCCH or PUSCH associations). The PDSCH HARQ-ACK associations 945 may indicate HARQ-ACK reporting subframes corresponding to subframes for PDSCH transmissions (e.g., subframes in which PDSCH transmissions may be sent and/or received). The PDSCH HARQ-ACK associations 945 may indicate the association sets and timing for the transmission of PDSCH HARQ-ACK information. It should be noted that some of the radio frames illustrated in FIG. 9 have been truncated for convenience.

The systems and methods described herein may be applied to one or more of the UL/DL configurations 941a-g illustrated in FIG. 9. For example, one or more PDSCH HARQ-ACK associations 945 corresponding to one of the UL/DL configurations 941a-g illustrated in FIG. 9 may be applied to communications between a UE 102 and eNB 160. For example, a DL-reference UL/DL configuration 941 may be determined (e.g., assigned to, applied to) for a serving cell. In this case, PDSCH HARQ-ACK associations 945 may specify PDSCH HARQ-ACK timing (e.g., a HARQ-ACK reporting subframe) for HARQ-ACK feedback transmissions corresponding to the serving cell.

A PDSCH HARQ-ACK association 945 may specify a particular (PDSCH HARQ-ACK) timing for receiving HARQ-ACK information corresponding to a PDSCH. A PDSCH HARQ-ACK association 945 may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

FIG. 10 illustrates various examples 1001 for determining whether there is a potential UL transmission in the later subframe of a cell group 130. PDSCH HARQ-ACK associations 1045 are indicated for HARQ-ACK reporting subframes corresponding to subframes for PDSCH transmissions.

As described above, some UL subframes may not have a DL association set and will not be used for HARQ-ACK reporting. The number of UL subframes in the DL reference UL/DL configuration of a TDD serving cell is the same as or is smaller than the number of UL subframes of the corresponding TDD serving cell. Therefore, if there are uplink subframes without a HARQ association timing, no HARQ-ACK will be reported in these subframes.

The first example 1001a depicts a single TDD cell with UL/DL configuration 0. In this implementation, UL subframe 3 and subframe 8 do not have a DL association. Therefore, subframe 3 and subframe 8 are not used for HARQ-ACK reporting.

The second example 1001b depicts an example of eIMTA TDD cell with an SIB1 UL/DL configuration 1 and a DL reference UL/DL configuration 2. In this implementation, subframes 3 and 8 can be dynamically configured as either UL or DL. Because there is no HARQ timing associated with them, subframes 3 and 8 are not used for HARQ-ACK reporting, even if they are configured as UL subframes.

The third example 1001c depicts TDD CA with different UL/DL configurations. In this implementation, a PCell has UL/DL configuration 2 and an SCell has UL/DL configuration 1. The DL reference UL/DL configuration of the SCell is the PCell UL/DL configuration 2. Thus, only subframes 2 and 7 can carry HARQ-ACK reporting. UL subframes 3 and 8 of the SCell are not used for HARQ-ACK reporting.

Figure 11:
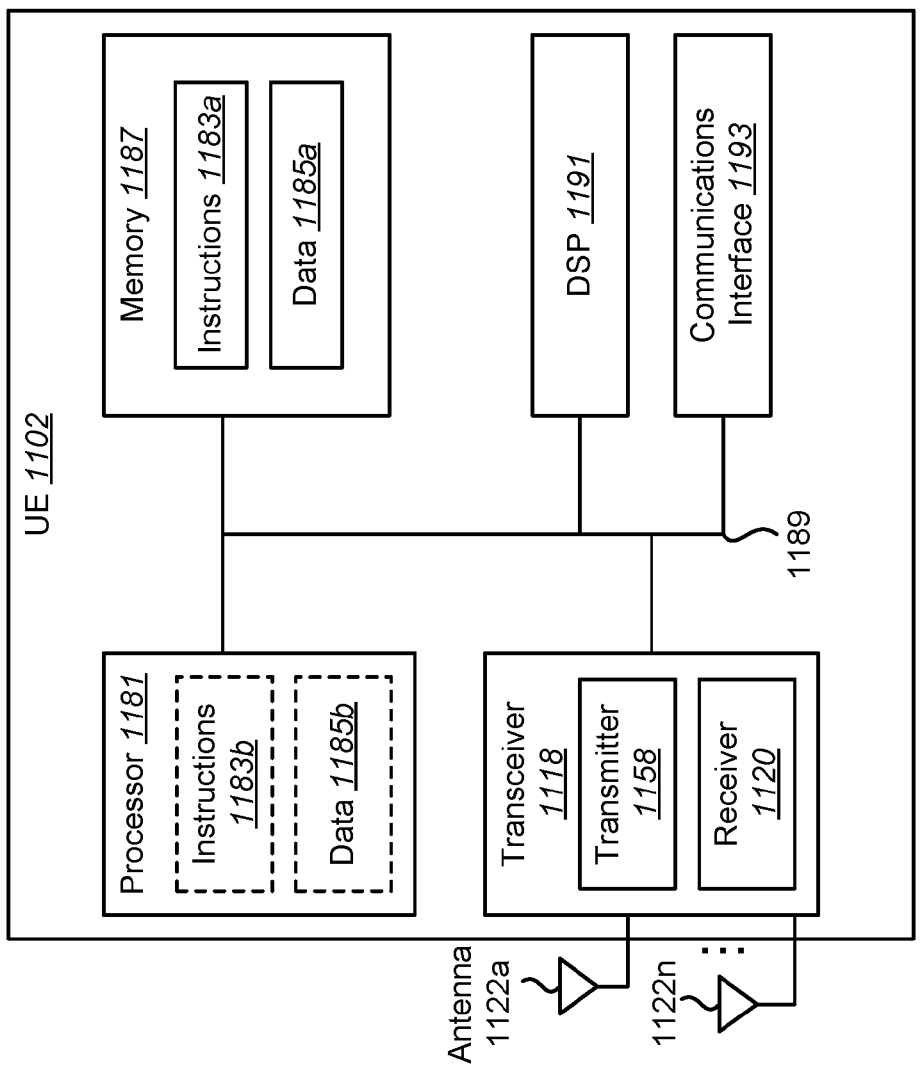
FIG. 11 illustrates various components that may be utilized in a UE.

FIG. 11 illustrates various components that may be utilized in a UE 1102. The UE 1102 described in connection with FIG. 11 may be implemented in accordance with the UE 102 described in connection with FIG. 1. The UE 1102 includes a processor 1181 that controls operation of the UE 1102. The processor 1181 may also be referred to as a central processing unit (CPU). Memory 1187, which may include read-only memory (ROM), random access memory (RAM), a combination of the two or any type of device that may store information, provides instructions 1183a and data 1185a to the processor 1181. A portion of the memory 1187 may also include non-volatile random access memory (NVRAM). Instructions 1183b and data 1185b may also reside in the processor 1181. Instructions 1183b and/or data 1185b loaded into the processor 1181 may also include instructions 1183a and/or data 1185a from memory 1187 that were loaded for execution or processing by the processor 1181. The instructions 1183b may be executed by the processor 1181 to implement one or more of the methods 400 and 800 described above.

The UE 1102 may also include a housing that contains one or more transmitters 1158 and one or more receivers 1120 to allow transmission and reception of data. The transmitter(s) 1158 and receiver(s) 1120 may be combined into one or more transceivers 1118. One or more antennas 1122a-n are attached to the housing and electrically coupled to the transceiver 1118.

The various components of the UE 1102 are coupled together by a bus system 1189, which may include a power bus, a control signal bus and a status signal bus, in addition to a data bus. However, for the sake of clarity, the various buses are illustrated in FIG. 11 as the bus system 1189. The UE 1102 may also include a digital signal processor (DSP) 1191 for use in processing signals. The UE 1102 may also include a communications interface 1193 that provides user access to the functions of the UE 1102. The UE 1102 illustrated in FIG. 11 is a functional block diagram rather than a listing of specific components.

Figure 12:
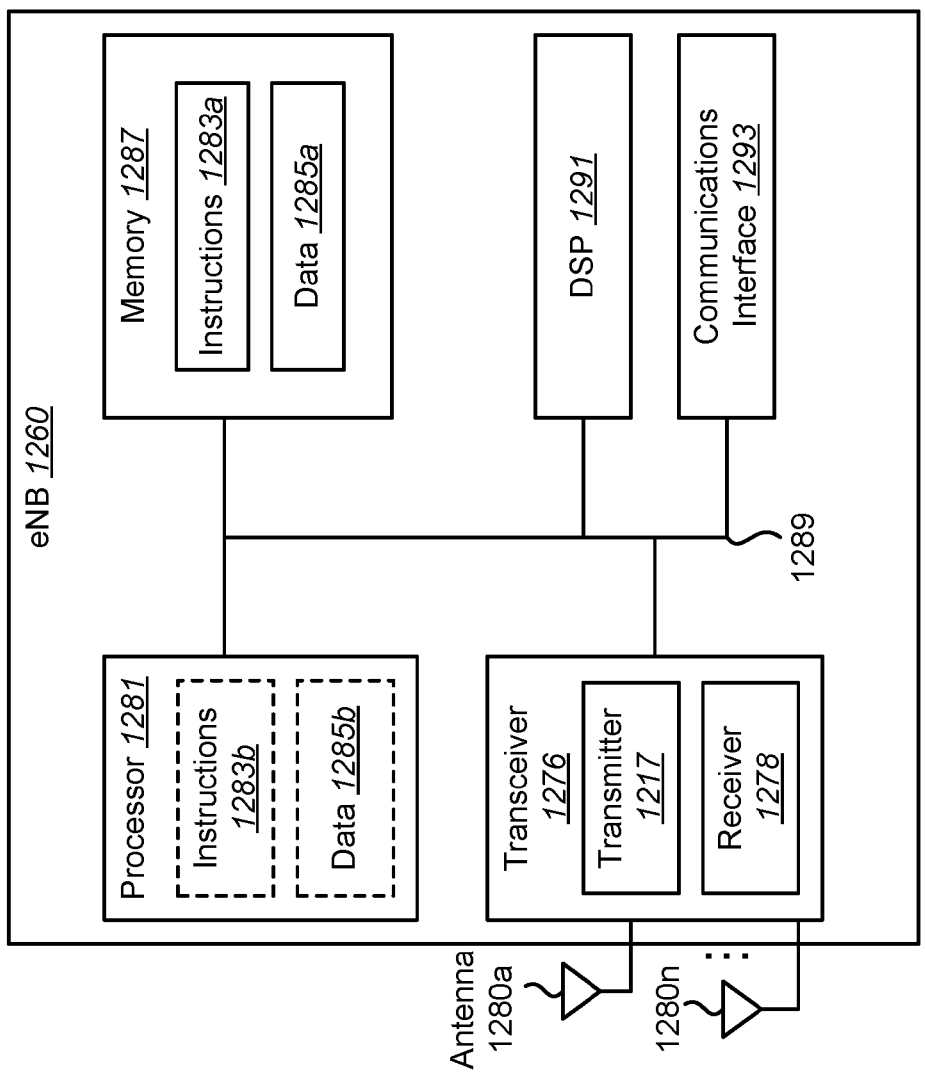
FIG. 12 illustrates various components that may be utilized in an eNB.

FIG. 12 illustrates various components that may be utilized in an eNB 1260. The eNB 1260 described in connection with FIG. 12 may be implemented in accordance with the eNB 160 described in connection with FIG. 1. The eNB 1260 includes a processor 1281 that controls operation of the eNB 1260. The processor 1281 may also be referred to as a central processing unit (CPU). Memory 1287, which may include read-only memory (ROM), random access memory (RAM), a combination of the two or any type of device that may store information, provides instructions 1283a and data 1285a to the processor 1281. A portion of the memory 1287 may also include non-volatile random access memory (NVRAM). Instructions 1283b and data 1285b may also reside in the processor 1281. Instructions 1283b and/or data 1285b loaded into the processor 1281 may also include instructions 1283a and/or data 1285a from memory 1287 that were loaded for execution or processing by the processor 1281. The instructions 1283b may be executed by the processor 1281 to implement the method 500 described above.

The eNB 1260 may also include a housing that contains one or more transmitters 1217 and one or more receivers 1278 to allow transmission and reception of data. The transmitter(s) 1217 and receiver(s) 1278 may be combined into one or more transceivers 1276. One or more antennas 1280a-n are attached to the housing and electrically coupled to the transceiver 1276.

The various components of the eNB 1260 are coupled together by a bus system 1289, which may include a power bus, a control signal bus and a status signal bus, in addition to a data bus. However, for the sake of clarity, the various buses are illustrated in FIG. 12 as the bus system 1289. The eNB 1260 may also include a digital signal processor (DSP) 1291 for use in processing signals. The eNB 1260 may also include a communications interface 1293 that provides user access to the functions of the eNB 1260. The eNB 1260 illustrated in FIG. 12 is a functional block diagram rather than a listing of specific components.

Figure 13:
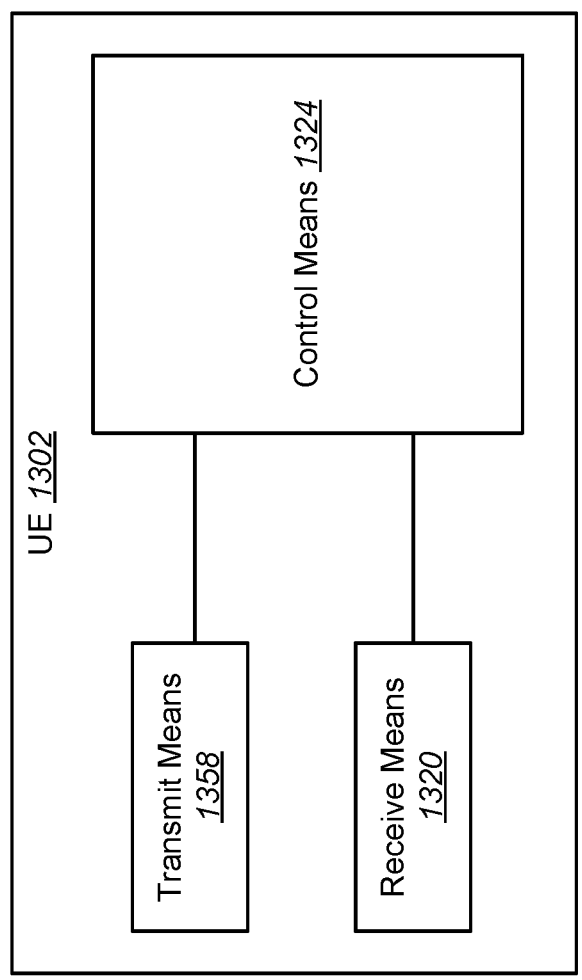
FIG. 13 is a block diagram illustrating one configuration of a UE in which systems and methods for sending feedback information may be implemented.

FIG. 13 is a block diagram illustrating one configuration of a UE 1302 in which systems and methods for sending feedback information may be implemented. The UE 1302 includes transmit means 1358, receive means 1320 and control means 1324. The transmit means 1358, receive means 1320 and control means 1324 may be configured to perform one or more of the functions described in connection with FIG. 4 and FIG. 8 above. FIG. 11 above illustrates one example of a concrete apparatus structure of FIG. 13. Other various structures may be implemented to realize one or more of the functions of FIG. 4 and FIG. 8. For example, a DSP may be realized by software.

Figure 14:
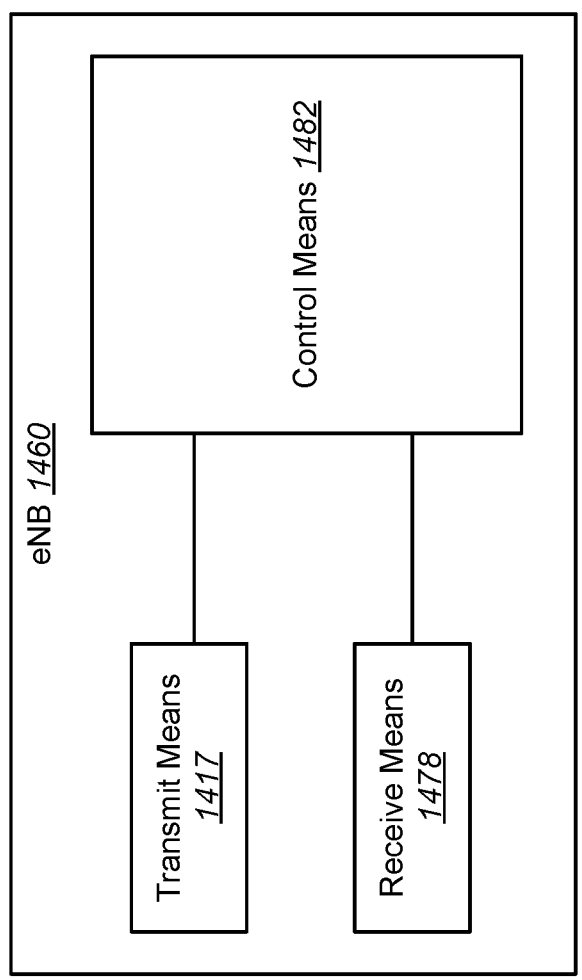
FIG. 14 is a block diagram illustrating one configuration of an eNB in which systems and methods for receiving feedback information may be implemented.

FIG. 14 is a block diagram illustrating one configuration of an eNB 1460 in which systems and methods for receiving feedback information may be implemented. The eNB 1460 includes transmit means 1417, receive means 1478 and control means 1482. The transmit means 1417, receive means 1478 and control means 1482 may be configured to perform one or more of the functions described in connection with FIG. 5 above. FIG. 12 above illustrates one example of a concrete apparatus structure of FIG. 14. Other various structures may be implemented to realize one or more of the functions of FIG. 5. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A user equipment (UE) comprising:
   a processor; and
   memory in electronic communication with the processor, wherein instructions stored in the memory are executable to:
      configure a first cell group (CG) and a second CG;
      configure a guaranteed power of the first CG and a guaranteed power of the second CG; and
      in a situation in which a timing difference between the first CG and the second CG is more than a threshold, wherein subframe n of the first CG overlaps subframe m−1 and subframe m of the second CG, perform uplink power allocation in the subframe n of the first CG, wherein the uplink power allocation is determined using a parameter $P_{CG1,n}$ given by equation (1):

$$P_{CG1,n} = P_{cmax} - \max\begin{pmatrix} P_{CG2,m-1}, \\ P_{Guaranteed,CG2} \end{pmatrix}, \quad (1)$$

where $P_{cmax}$ is a maximum allowed transmission power for the UE, $P_{CG2,m-1}$ is a power allocated in the subframe m−1 of the second CG and $P_{Guaranteed,CG2}$ is the guaranteed power of the second CG.

2. The UE of claim 1, wherein
in a situation in which the timing difference between the first CG and the second CG is more than the threshold, if a subframe is configured for physical random access channel (PRACH), a power for the PRACH is reserved with higher priority than other channels.

3. The UE of claim 1, wherein
in a situation in which the timing difference between the first CG and the second CG is more than the threshold, if the UE knows there is no uplink transmission in the subframe m of the second CG, the $P_{CG1,n}$ given by equation (2):

$$P_{CG1,n} = P_{cmax} - P_{CG2,m-1} \quad (2).$$

4. An enhanced node B (eNB) communicating with a user equipment (UE), the eNB comprising:
   a processor; and
   memory in electronic communication with the processor, wherein instructions stored in the memory are executable to:
      configure, to the UE, a first cell group (CG) and a second CG;
      configure, to the UE, a guaranteed power of the first CG and a guaranteed power of the second CG; and
      in a situation in which a timing difference between the first CG and the second CG is more than a threshold, wherein subframe n of the first CG overlaps subframe m−1 and subframe m of the second CG, receive an uplink transmission of the first CG based on uplink power allocation in the subframe n of the first CG, wherein the uplink power allocation is determined using a parameter $P_{CG1,n}$ given by equation (1):

$$P_{CG1,n} = P_{cmax} - \max\begin{pmatrix} P_{CG2,m-1}, \\ P_{Guaranteed,CG2} \end{pmatrix}, \quad (1)$$

where $P_{cmax}$ is a maximum allowed transmission power for the UE, $P_{CG2,m-1}$ is a power allocated in the subframe m−1 of the second CG and $P_{Guaranteed,CG2}$ is the guaranteed power of the second CG.

5. The eNB of claim 4, wherein
in a situation in which the timing difference between the first CG and the second CG is more than the threshold, if a subframe is configured for physical random access channel (PRACH), a power for the PRACH is reserved with higher priority than other channels.

6. The eNB of claim 4, wherein
in a situation in which the timing difference between the first CG and the second CG is more than the threshold, if it is known, by the UE, that there is no uplink transmission in the subframe m of the second CG, the $P_{CG1,n}$ given by equation (2):

$$P_{CG1,n} = P_{cmax} - P_{CG2,m-1} \quad (2).$$

7. A method in a user equipment (UE), the method comprising:
   configuring a first cell group (CG);
   configuring a second CG;
   configuring a guaranteed power of the first CG;
   configuring a guaranteed power of the second CG; and
   in a situation in which a timing difference between the first CG and the second CG is more than a threshold, wherein subframe n of the first CG overlaps subframe m−1 and subframe m of the second CG, performing uplink power allocation in the subframe n of the first CG, wherein the uplink power allocation is determined using a parameter $P_{CG1,n}$ given by equation (1):

$$P_{CG1,n} = P_{cmax} - \max\begin{pmatrix} P_{CG2,m-1}, \\ P_{Guaranteed,CG2} \end{pmatrix}, \quad (1)$$

where $P_{cmax}$ cmax is a maximum allowed transmission power for the UE, $P_{CG2,m-1}$ is a power allocated in the subframe m−1 of the second CG and $P_{Guaranteed,CG2}$ is the guaranteed power of the second CG.

8. A method in an enhanced node B (eNB) communicating with a user equipment (UE), the method comprising:
   configuring, to the UE, a first cell group (CG);
   configuring, to the UE, a second CG;
   configuring, to the UE, a guaranteed power of the first CG;
   configuring, to the UE, a guaranteed power of the second CG; and
   in a situation in which a timing difference between the first CG and the second CG is more than a threshold, wherein subframe n of the first CG overlaps subframe m−1 and subframe m of the second CG, receiving an uplink transmission of the first CG based on uplink power allocation in the subframe n of the first CG, wherein the uplink power allocation is determined using a parameter $P_{CG1,n}$ given by equation (1):

$$P_{CG1,n} = P_{cmax} - \max\left(\begin{array}{c} P_{CG2,m-1}, \\ P_{Guaranteed,CG2} \end{array}\right), \quad (1)$$

where $P_{cmax}$ is a maximum allowed transmission power for the UE, $P_{CG2,m-1}$ is a power allocated in the subframe m−1 of the second CG and $P_{Guaranteed,CG2}$ is the guaranteed power of the second CG.

* * * * *